(12) United States Patent
Amano et al.

(10) Patent No.: US 11,754,174 B2
(45) Date of Patent: Sep. 12, 2023

(54) CONTROL DEVICE AND CONTROL METHOD FOR AUTOMATIC TRANSMISSION

(71) Applicants: JATCO Ltd, Fuji (JP); NISSAN MOTOR CO., LTD., Yokohama (JP)

(72) Inventors: Norihira Amano, Fuji (JP); Masahiro Hamano, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/642,145

(22) PCT Filed: Nov. 20, 2020

(86) PCT No.: PCT/JP2020/043399
§ 371 (c)(1),
(2) Date: Jul. 7, 2022

(87) PCT Pub. No.: WO2021/106785
PCT Pub. Date: Jun. 3, 2021

(65) Prior Publication Data
US 2022/0333683 A1 Oct. 20, 2022

(30) Foreign Application Priority Data
Nov. 29, 2019 (JP) .................................. 2019-216986

(51) Int. Cl.
*B60W 10/11* (2012.01)
*F16H 61/12* (2010.01)
(Continued)

(52) U.S. Cl.
CPC ............. *F16H 61/12* (2013.01); *B60W 10/06* (2013.01); *B60W 10/11* (2013.01);
(Continued)

(58) Field of Classification Search
CPC .. F16H 61/12; F16H 61/68; F16H 2061/1232; F16H 2061/124; B60W 10/06;
(Continued)

(56) References Cited

U.S. PATENT DOCUMENTS 8,560,190 B2 * 10/2013 Sugiura ................... F16H 61/20
701/55
8,725,343 B2 * 5/2014 Shimizu .................. F16H 61/12
701/55

(Continued)

FOREIGN PATENT DOCUMENTS

JP 2010-151263 A 7/2010

*Primary Examiner* — Roger L Pang
(74) *Attorney, Agent, or Firm* — Foley & Lardner LLP

(57) ABSTRACT

The transmission control unit includes a gear ratio abnormality determination unit and a limp home control unit. The gear ratio abnormality determination unit is configured to determine that a gear ratio is abnormal when, during travelling at a predetermined gear position, a difference between an actual gear ratio, which is calculated based on a transmission input shaft rotation speed and a transmission output shaft rotation speed, and a set gear ratio at the predetermined gear position is equal to or greater than a set value. The limp home control unit is configured to, when the gear ratio abnormality determination unit determines that the gear ratio is abnormal, output a disengagement instruction for disengaging all of the plurality of friction elements, when it is confirmed that a neutral state is shifted to according to the output of the disengagement instruction, determine engagement/disengagement of a specific friction element among the plurality of friction elements based on rotation/stop information of a rotation member of the stepped transmission mechanism, and determine an evacuation gear position based on determination information on the engagement/disengagement of the specific friction element, and shift the gear position to the determined evacuation gear position.

9 Claims, 8 Drawing Sheets

(51) Int. Cl.
  *B60W 10/06* (2006.01)
  *B60W 30/18* (2012.01)
  *F16H 61/02* (2006.01)
  *F16H 61/16* (2006.01)
  *F16H 61/682* (2006.01)

(52) U.S. Cl.
  CPC ... *B60W 30/18009* (2013.01); *F16H 61/0204* (2013.01); *F16H 61/16* (2013.01); *F16H 61/682* (2013.01); *B60W 2510/0208* (2013.01); *B60W 2510/104* (2013.01); *B60W 2510/1005* (2013.01); *B60W 2510/1015* (2013.01); *B60W 2710/0666* (2013.01); *B60W 2710/1005* (2013.01); *F16H 2061/124* (2013.01); *F16H 2061/1232* (2013.01); *F16H 2200/0065* (2013.01); *F16H 2200/2012* (2013.01); *F16H 2200/2046* (2013.01)

(58) Field of Classification Search
  CPC .......... B60W 10/11; B60W 30/18009; B60W 2510/1005; B60W 2510/0208; B60W 2510/1015; B60W 2510/104; B60W 2710/0666; B60W 2710/1005
  USPC ....................................................... 477/111
  See application file for complete search history.

(56) References Cited

U.S. PATENT DOCUMENTS

| | | | |
|---|---|---|---|
| 10,041,586 B2 * | 8/2018 | Lochocki, Jr. ...... | F16H 61/0204 |
| 11,536,365 B2 * | 12/2022 | Tooyama ................ | F16H 59/70 |
| 2010/0168972 A1 | 7/2010 | Murakami et al. | |

* cited by examiner

ENGAGEMENT TABLE

| NUMBER OF GEAR POSITION | B1 | B2 | B3 | K1 | K2 | K3 |
|---|---|---|---|---|---|---|
| 1 | | ● | ● | | | ● |
| 2 | | ● | ● | | ● | ● |
| 3 | | ● | ● | | ● | |
| 4 | | ● | ● | ● | | |
| 5 | | | ● | ● | ● | |
| 6 | | | ● | ● | ● | ● |
| 7 | | | ● | ● | | ● |
| 8 | ● | | | ● | | ● |
| 9 | ● | | ● | ● | | |
| Rev | ● | ● | ● | | | |
| N RANGE, P RANGE | | | | | | |

CONTROL DEVICE AND CONTROL METHOD FOR AUTOMATIC TRANSMISSION

TECHNICAL FIELD

The present invention relates to a control of an automatic transmission to be mounted on a vehicle.

BACKGROUND ART

JP2010-151263A discloses that, in a case where a gear ratio is determined to be any of gear ratios of respective gear positions during a first predetermined time T1 from completion of a shift (for example, a 3th gear position→4th gear position shift), and an original gear ratio (4TH) is different from a calculated gear ratio (5TH), it is determined that a clutch C-3, which is to be disengaged, has an engagement fail.

SUMMARY OF INVENTION

However, in JP2010-151263A, when an actual gear ratio does not match a set gear ratio of a predetermined gear position, that is, there is a gear ratio abnormality in which the gear ratio deviates from a 4th speed gear ratio or a 5th speed gear ratio, a friction element that is erroneously engaged or erroneously disengaged among a plurality of friction elements cannot be specified. Therefore, there is a problem that when a gear ratio abnormality occurs, an evacuation gear position for a limp home destination cannot be determined, and it is impossible to shift to a limp home control and ensure a travelling performance of a vehicle while avoiding sudden deceleration caused by an erroneously engaged element.

The invention is made in view of the above-mentioned problem, and an object of the invention is to, when there is a gear ratio abnormality in which the actual gear ratio deviates from the set gear ratio, shift to a limp home control and ensure a travelling performance of a vehicle while avoiding sudden deceleration caused by an erroneously engaged element.

To achieve the object, a control device for an automatic transmission according to an aspect of the present invention includes a transmission control unit configured to control a shift solenoid provided for each of a plurality of friction elements of a stepped transmission mechanism, and perform a shift control in which a plurality of gear positions are switched by changing engaged states of the plurality of friction elements.

The transmission control unit includes a gear ratio abnormality determination unit and a limp home control unit, The gear ratio abnormality determination unit is configured to determine that a gear ratio is abnormal when, during travelling at a predetermined gear position, a difference between an actual gear ratio, which is calculated based on a transmission input shaft rotation speed and a transmission output shaft rotation speed, and a set gear ratio at the predetermined gear position is equal to or greater than a set value, The limp home control unit is configured to, when the gear ratio abnormality determination unit determines that the gear ratio is abnormal, output a disengagement instruction for disengaging all of the plurality of friction elements, when it is confirmed that a neutral state is shifted to according to the output of the disengagement instruction, determine engagement/disengagement of a specific friction element among the plurality of friction elements based on rotation/stop information of a rotation member of the stepped transmission mechanism, and determine an evacuation gear position based on determination information on the engagement/disengagement of the specific friction element, and shift the gear position to the determined evacuation gear position.

According to the above-mentioned aspect, since the above-mentioned solution is adopted, when there is a gear ratio abnormality in which the actual gear ratio deviates from the set gear ratio, it is possible to shift to the limp home control and ensure the travelling performance of the vehicle while avoiding sudden deceleration caused by the erroneously engaged element.

DESCRIPTION OF EMBODIMENTS

Figure 1:
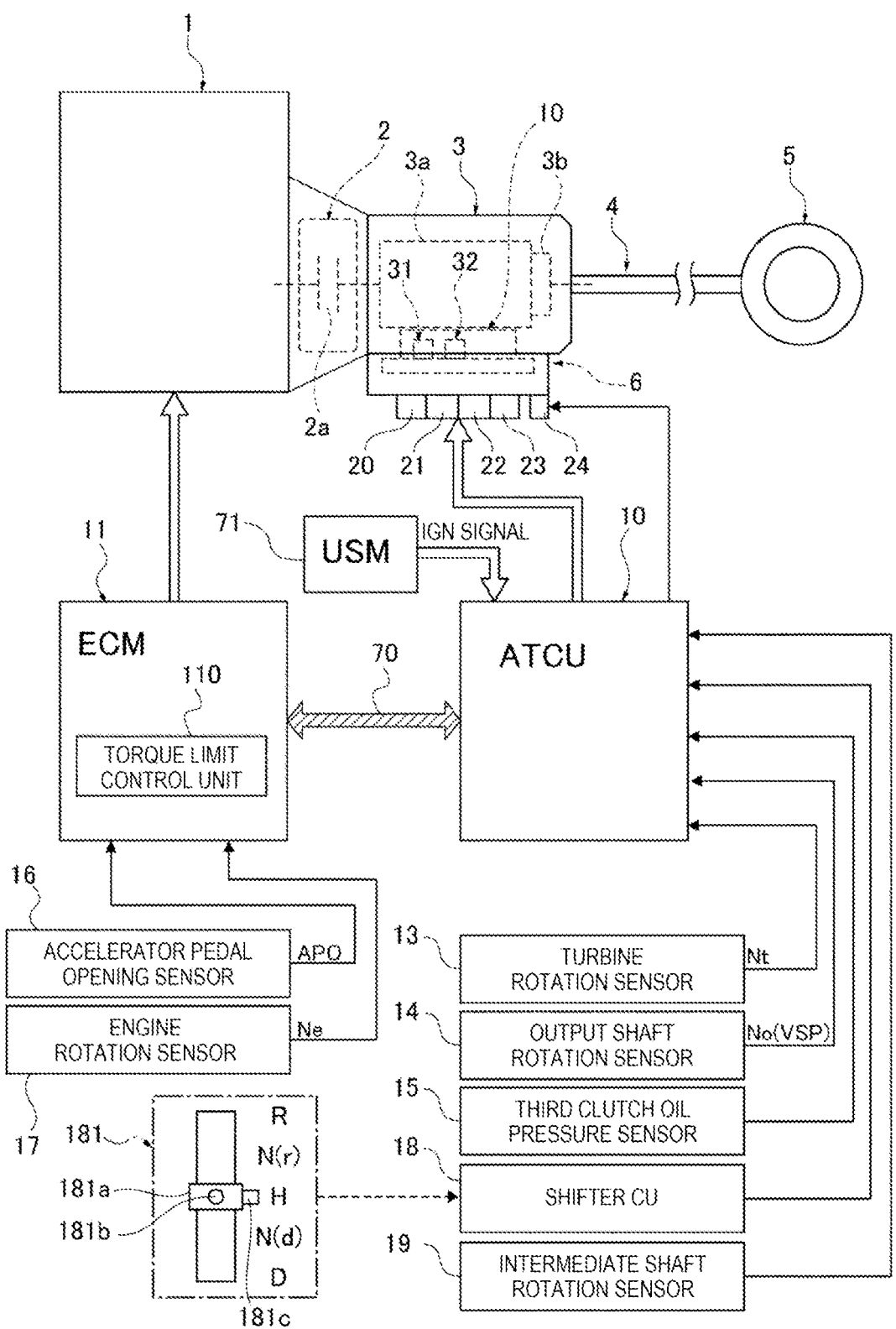
FIG. 1 is an overall system diagram showing an engine vehicle provided with an automatic transmission to which a control device of a first embodiment is applied.

Hereinafter, a control device for an automatic transmission according to an embodiment of the invention will be described with reference to a first embodiment shown in the drawings.

First Embodiment

A control device of a first embodiment is applied to an engine vehicle (an example of a vehicle) provided with an automatic transmission controlled by shift-by-wire and park-by-wire and having gear positions including nine forward speeds and one reverse speed. Hereinafter, a configuration of the first embodiment will be described separately as "Overall System Configuration", "Detailed Configuration of Automatic Transmission", "Detailed Configuration of Hydraulic Control System", "Detailed Configuration of Shift Control Unit", and "Configuration of Shift Control Process".

Overall System Configuration (FIG. 1)

Hereinafter, the overall system configuration will be described with reference to FIG. 1. As shown in FIG. 1, a driving system of the engine vehicle includes an engine 1 (a travelling driving source), a torque converter 2, an automatic transmission 3, a propeller shaft 4, and a driving wheel 5. The torque converter 2 is provided with a built-in lock-up clutch 2a that directly connects a crankshaft of the engine 1 and an input shaft IN of the automatic transmission 3 by engagement. The automatic transmission 3 is provided with a built-in gear train 3a and a built-in park gear 3b. A control valve unit 6 including spool valves, a hydraulic control circuit, solenoid valves, and the like for shifting is attached to the automatic transmission 3.

The control valve unit 6 includes, as the solenoid valves, six clutch solenoids 20 provided for friction elements, and one line pressure solenoid 21, one lubrication solenoid 22, and one lock-up solenoid 23. That is, a total of 9 solenoid valves are provided. Each of these solenoid valves has a three-way linear solenoid structure, and performs a pressure regulation operation in response to a control command from a transmission control unit 10.

As shown in FIG. 1, an electronic control system of the engine vehicle includes the transmission control unit 10 (abbreviated as "ATCU"), an engine control module 11 (abbreviated as "ECM"), and a CAN communication line 70. Here, the transmission control unit 10 is started or stopped according to an ignition signal from a sensor module unit 71 (abbreviated as "USM"). That is, the start or stop of the transmission control unit 10 is defined as a "wake-up or sleep control" in which a start variation increases as compared with a case where the start or stop is controlled by an ignition switch.

The transmission control unit 10 is mechanically and electrically integrally provided on an upper surface of the control valve unit 6, and includes, on a unit board thereof, a main board temperature sensor 31 and a sub board temperature sensor 32 by a redundant system while ensuring independence between the board temperature sensors. That is, the main board temperature sensor 31 and the sub board temperature sensor 32 transmit sensor value information to the transmission control unit 10, but unlike well-known automatic transmission units, temperature information that is obtained not in direct contact with a transmission fluid (ATF) in an oil pan is transmitted. Signals from a turbine rotation sensor 13, an output shaft rotation sensor 14, and a third clutch oil pressure sensor 15 are also input to the transmission control unit 10. Further, signals from a shifter control unit 18, an intermediate shaft rotation sensor 19, and the like are also input to the transmission control unit 10.

The turbine rotation sensor 13 detects a turbine rotation speed (=transmission input shaft rotation speed) of the torque converter 2 and transmits a signal indicating a turbine rotation speed Nt to the transmission control unit 10. The output shaft rotation sensor 14 detects an output shaft rotation speed of the automatic transmission 3 and transmits a signal indicating an output shaft rotation speed No (=vehicle speed VSP) to the transmission control unit 10. The third clutch oil pressure sensor 15 detects a clutch oil pressure of a third clutch K3 and transmits a signal indicating a third clutch oil pressure PK3 to the transmission control unit 10.

The shifter control unit 18 determines a range position selected by a driver performing a select operation on a shifter 181, and transmits a range position signal to the transmission control unit 10. The shifter 181 has a momentary structure, and includes a P range button 181b on an upper portion of an operation unit 181a and a lock release button 181c (only when N→R) on a side portion of the operation unit 181a. Further, range positions include an H range (home range), an R range (reverse range), a D range (drive range), and N(d) and N(r) (neutral ranges). The intermediate shaft rotation sensor 19 detects a rotation speed of an intermediate shaft (an intermediate shaft=a rotation member connected to a first carrier C1), and transmits a signal indicating an intermediate shaft rotation speed Nint to the transmission control unit 10 (see FIG. 2).

The transmission control unit 10 monitors changes in an operating point (VSP, APO), that is related to a vehicle speed VSP and an accelerator pedal opening APO, on a shift map (see FIG. 4), so as to perform shift control according to the following basic shift patterns:
  1. Auto upshift (implemented by a vehicle speed increase in a state where an accelerator pedal opening is maintained)
  2. Foot release upshift (implemented by an operation in which a foot leaves the accelerator pedal)
  3. Foot ease upshift (implemented by an operation in which the accelerator pedal is eased up)
  4. Power-on downshift (implemented by a vehicle speed decrease while the accelerator pedal opening is maintained)
  5. Small opening sudden press downshift (implemented by pressing an accelerator pedal by a small operation amount)
  6. Large opening sudden press downshift (implemented by pressing an accelerator pedal by a large operation amount: "kickdown")
  7. Slow press downshift (implemented by pressing an accelerator pedal slowly and a vehicle speed increase)
  8. Coast downshift (implemented by a vehicle speed decrease in an accelerator pedal release operation).

Signals from an accelerator pedal opening sensor 16, an engine rotation sensor 17, and the like are input to the engine control module 11.

The accelerator pedal opening sensor 16 detects an accelerator pedal opening that is based on an accelerator pedal operation of the driver, and transmits a signal indicating an accelerator pedal opening APO to the engine control module 11. The engine rotation sensor 17 detects a rotation speed of the engine 1 and transmits a signal indicating an engine rotation speed Ne to the engine control module 11.

The engine control module 11 is connected to the transmission control unit 10 via the CAN communication line 70 such that information can be bidirectionally exchanged. The engine control module 11 includes a torque limit control unit 110 that sets an engine torque to a torque limited by a predetermined upper limit torque when receiving a torque limit request from the transmission control unit 10 via the CAN communication line 70. In addition, when receiving an information request from the transmission control unit 10, the engine control module 11 outputs information on the accelerator pedal opening APO and the engine rotation speed Ne to the transmission control unit 10. Further, information on an engine torque Te and a turbine torque Tt that are obtained by estimation calculation is output to the transmission control unit 10.

Figures 2, 3:
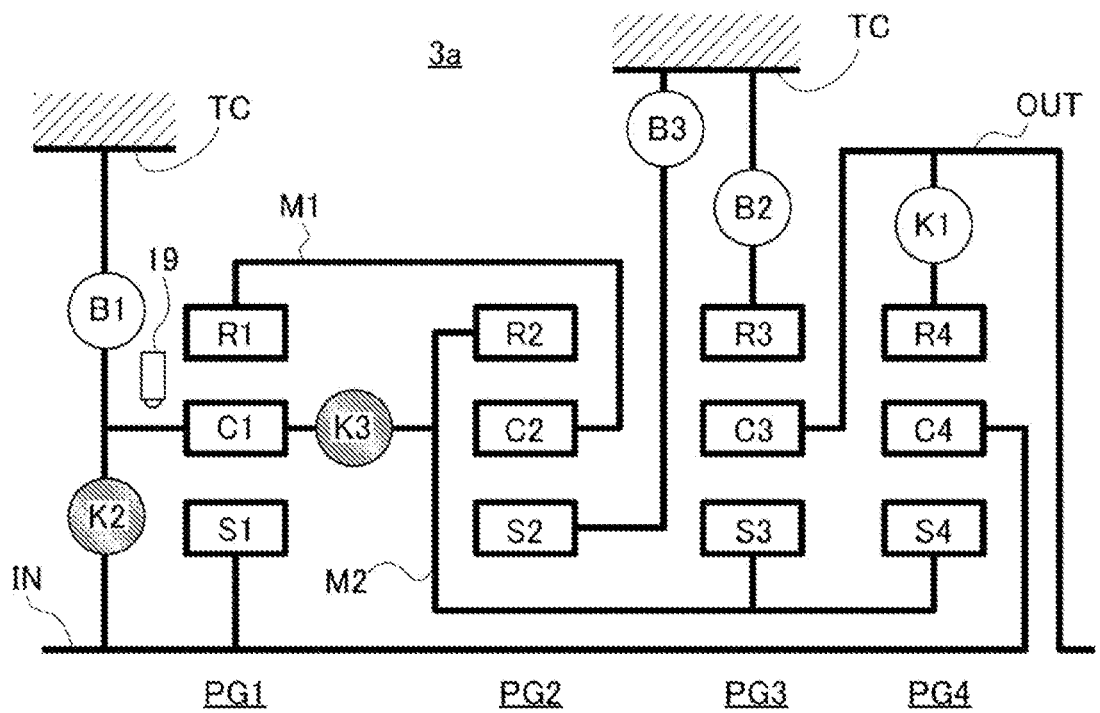
FIG. 2 is a skeleton diagram showing an example of a gear train of the automatic transmission.
FIG. 3 is an engagement table showing engaged states of shifting friction elements in the automatic transmission at each gear position.
Figure 4:
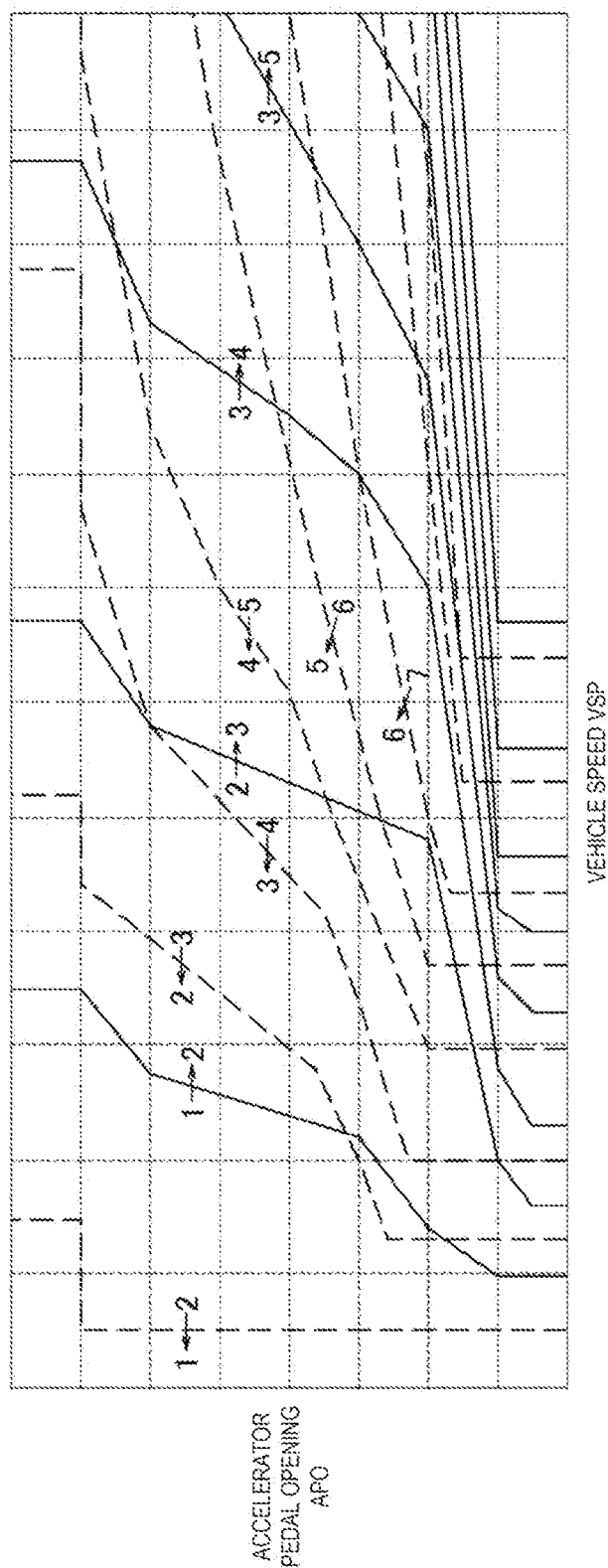
FIG. 4 is a shift map showing an example of a shift map in the automatic transmission.

Detailed Configuration of Automatic Transmission (FIGS. 2 to 4)

Hereinafter, the detailed configuration of the automatic transmission 3 will be described with reference to FIGS. 2 to 4. The automatic transmission 3 includes the gear train 3a (a stepped transmission mechanism) in which a plurality of gear positions can be set and a plurality of friction elements, and is characterized by the following points.

(a) A one-way clutch that mechanically engages and idles is not used as a shift element.

(b) Engagement/disengaged states of a first brake B1, a second brake B2, a third brake B3, a first clutch K1, a second clutch K2, and the third clutch K3, which are friction elements, are independently controlled by the clutch solenoids 20 at the time of shifting.

(c) During an in-gear state in which an engaged state is maintained in an engagement pressure control of the friction elements, a maximum pressure command is not output to the clutch solenoids, but an intermediate pressure command corresponding to an input torque capable of preventing a clutch slippage is output to the clutch solenoids 20.

(d) The second clutch K2 and the third clutch K3 include centrifugal cancel chambers that offset a centrifugal pressure caused by a centrifugal force acting on a clutch piston oil chamber.

As shown in FIG. 2, the automatic transmission 3 includes, as planetary gears constituting the gear train 3a, a first planetary gear PG1, a second planetary gear PG2, a third planetary gear PG3, and a fourth planetary gear PG4 in this order from a transmission input shaft IN to a transmission output shaft OUT.

The first planetary gear PG1 is a single pinion planetary gear, and includes a first sun gear S1, the first carrier C1 that supports pinions which mesh with the first sun gear S1, and a first ring gear R1 that meshes with the pinions.

The second planetary gear PG2 is a single pinion planetary gear, and includes a second sun gear S2, a second carrier C2 that supports pinions which mesh with the second sun gear S2, and a second ring gear R2 that meshes with the pinions.

The third planetary gear PG3 is a single pinion planetary gear, and includes a third sun gear S3, a third carrier C3 that supports pinions which mesh with the third sun gear S3, and a third ring gear R3 that meshes with the pinions.

The fourth planetary gear PG4 is a single pinion planetary gear, and includes a fourth sun gear S4, a fourth carrier C4 that supports pinions which mesh with the fourth sun gear S4, and a fourth ring gear R4 that meshes with the pinions.

As shown in FIG. 2, the automatic transmission 3 includes the transmission input shaft IN, the transmission output shaft OUT, a first connecting member M1, a second connecting member M2, and a transmission case TC. As friction elements that are engaged or disengaged by shifting, the first brake B1, the second brake B2, the third brake B3, the first clutch K1, the second clutch K2, and the third clutch K3 are provided.

The transmission input shaft IN is a shaft in which a driving force from the engine 1 is input via the torque converter 2, and is connected to the first sun gear S1 and the fourth carrier C4 all the time. Further, the input shaft IN is detachably connected to the first carrier C1 via the second clutch K2.

The transmission output shaft OUT is a shaft that outputs a shifted drive torque to the driving wheel 5 via the propeller shaft 4 and a final gear (not shown), and is connected to the third carrier C3 all the time. Further, the output shaft OUT is detachably connected to the fourth ring gear R4 via the first clutch K1.

The first connecting member M1 is a member that connects the first ring gear R1 of the first planetary gear PG1 and the second carrier C2 of the second planetary gear PG2 all the time with no friction element interposed therebetween. The second connecting member M2 is a member that connects the second ring gear R2 of the second planetary gear PG2, the third sun gear S3 of the third planetary gear PG3, and the fourth sun gear S4 of the fourth planetary gear PG4 all the time with no friction element interposed therebetween.

The first brake B1 is a friction element capable of locking rotation of the first carrier C1 with respect to the transmission case TC. The second brake B2 is a friction element capable of locking rotation of the third ring gear R3 with respect to the transmission case TC. The third brake B3 is a friction element capable of locking rotation of the second sun gear S2 with respect to the transmission case TC.

The first clutch K1 is a friction element that selectively connects the fourth ring gear R4 and the output shaft OUT. The second clutch K2 is a friction element that selectively connects the input shaft IN and the first carrier C1. The third clutch K3 is a friction element that selectively connects the first carrier C1 and the second connecting member M2.

A shift configuration in which each gear position is achieved will be described with reference to FIG. 3. A first-speed position (1st) is achieved by simultaneously engaging the second brake B2, the third brake B3, and the third clutch K3. A second speed position (2nd) is achieved by simultaneously engaging the second brake B2, the second clutch K2, and the third clutch K3. A third speed position (3rd) is achieved by simultaneously engaging the second brake B2, the third brake B3, and the second clutch K2. A fourth speed position (4th) is achieved by simultaneously engaging the second brake B2, the third brake B3, and the first clutch K1. A fifth speed position (5th) is achieved by simultaneously engaging the third brake B3, the first clutch K1, and the second clutch K2. The above-mentioned first to fifth speed positions are underdrive gear positions having a reduction gear ratio exceeding 1.

A sixth speed position (6th) is achieved by simultaneously engaging the first clutch K1, the second clutch K2, and the third clutch K3. This sixth speed position is a direct connection position with a gear ratio of 1.

A seventh speed position (7th) is achieved by simultaneously engaging the third brake B3, the first clutch K1, and the third clutch K3. An eighth speed position (8th) is achieved by simultaneously engaging the first brake B1, the first clutch K1, and the third clutch K3. A ninth speed position (9th) is achieved by simultaneously engaging the first brake B1, the third brake B3, and the first clutch K1. The above-mentioned seventh to ninth speed positions are overdrive gear positions having a speed increasing gear ratio of less than 1.

Further, when the gear position is upshifted or downshifted to an adjacent gear position among the gear positions of the first-speed position to the ninth speed position, as shown in FIG. 3, engagement of the friction elements is changed. That is, shifting to the adjacent gear position is achieved by maintaining engagement of two friction elements among three friction elements, disengaging one friction element, and engaging another one friction element.

A reverse speed position (Rev) based on a selection of an R range position is achieved by simultaneously engaging the first brake B1, the second brake B2, and the third brake B3.

When an N range position and a P range position are selected, basically all of the six friction elements B1, B2, B3, K1, K2, and K3 are disengaged.

Further, a shift map as shown in FIG. 4 is stored and set in the transmission control unit 10, and a shift by switching a gear position from the first-speed position to the ninth speed position on a forward side by a selection of the D range is performed according to this shift map. That is, when the operating point (VSP, APO) at that time crosses an upshift line shown by a solid line in FIG. 4, an upshifting request is issued. In addition, when the operating point (VSP, APO) crosses a downshift line shown by a broken line in FIG. 4, a downshifting request is issued.

Figure 5:
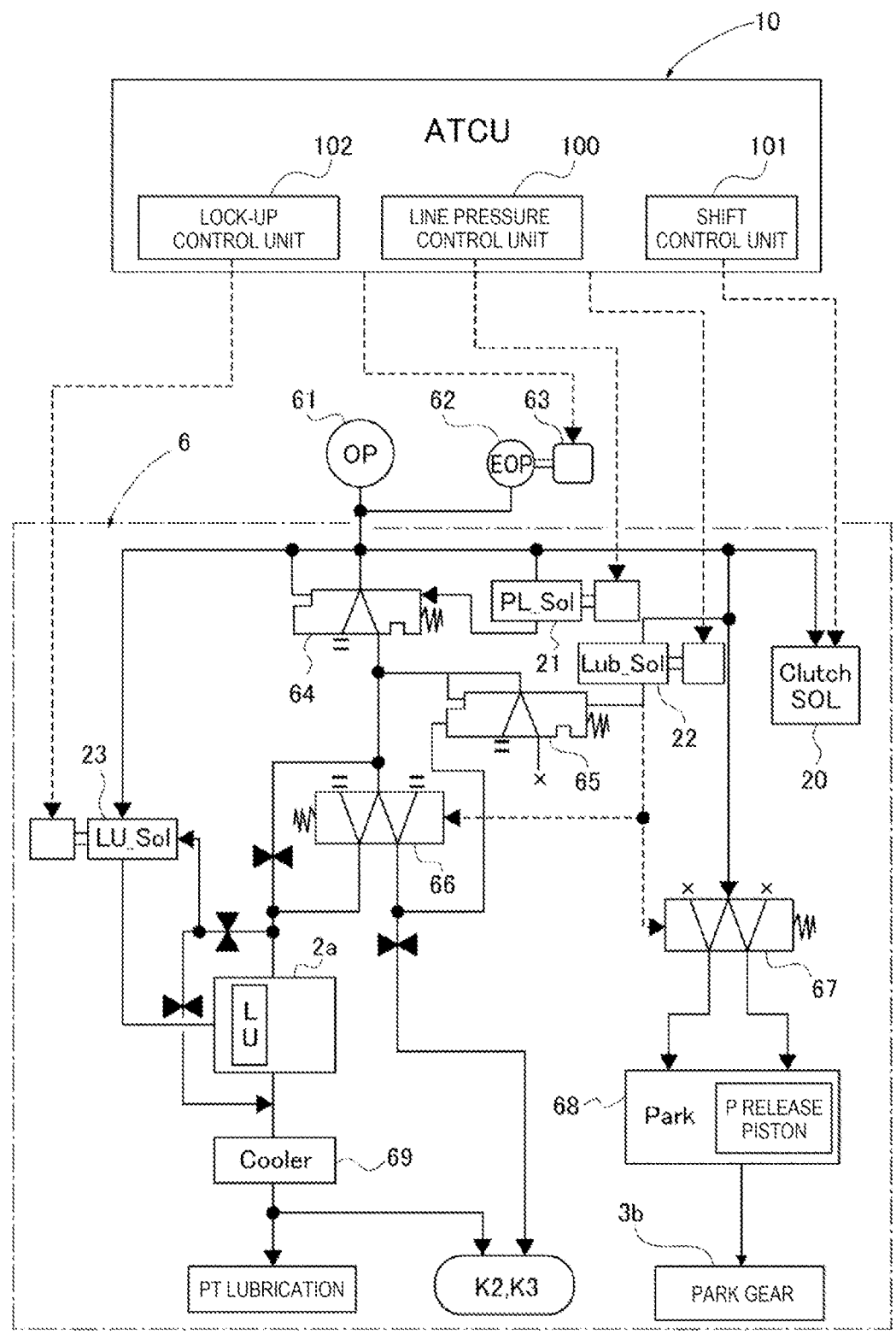
FIG. 5 is a hydraulic control system configuration diagram showing a control valve unit of the automatic transmission.

Detailed Configuration of Hydraulic Control System (FIG. 5)

Hereinafter, the detailed configuration of the hydraulic control system will be described with reference to FIG. 5. As shown in FIG. 5, the control valve unit 6 which is hydraulically controlled by the transmission control unit 10 includes, as hydraulic sources, a mechanical oil pump 61 and an electric oil pump 62. The mechanical oil pump 61 is pump-driven by the engine 1, and the electric oil pump 62 is pump-driven by an electric motor 63.

The control valve unit 6 includes, as valves provided in the hydraulic control circuit, the line pressure solenoid 21, a line pressure regulating valve 64, the clutch solenoid 20, and the lock-up solenoid 23. The control valve unit 6 also includes the lubrication solenoid 22, a lubrication pressure regulating valve 65, and a boost switching valve 66. The control valve unit 6 further includes a P-nP switching valve 67 and a park hydraulic actuator 68.

The line pressure regulating valve 64 regulates, according to a valve operation signal pressure from the line pressure solenoid 21, a pressure of an oil, that is discharged from at least one of the mechanical oil pump 61 and the electric oil pump 62, to a line pressure PL.

The line pressure solenoid 21 regulates a pressure and is driven, according to a control command from a line pressure control unit 100 of the transmission control unit 10. The line pressure control unit 100 controls the line pressure PL based on a target line pressure characteristic with respect to a magnitude of an input torque applied to the gear train 3a.

The clutch solenoid 20 is a shift solenoid that uses the line pressure PL as an initial pressure and controls an engagement pressure and a disengagement pressure for each of the friction elements (B1, B2, B3, K1, K2, K3). Although only one clutch solenoid 20 is illustrated in FIG. 5, six solenoids are provided for the friction elements (B1, B2, B3, K1, K2, K3). The clutch solenoid 20 regulates a pressure and is driven, according to a control command from a shift control unit 101 of the transmission control unit 10, and in order to improve fuel efficiency, the intermediate pressure command corresponding to the input torque capable of preventing the clutch slippage is output to the clutch solenoid 20 for the friction element that is brought into an engaged state during the in-gear state.

The lock-up solenoid 23 controls a clutch differential pressure of the lock-up clutch 2a by using the line pressure PL and a pressure regulating excess oil that are generated by the line pressure regulating valve 64 when the lock-up clutch 2a is engaged.

The lock-up solenoid 23 regulates the pressure and is driven, according to a control command from a lock-up control unit 102 of the transmission control unit 10. During travelling in a region of a predetermined vehicle speed or higher set in a low vehicle speed region, the lock-up control unit 102 executes, regardless of a gear position or a shift operation of the gear train 3a, a clutch differential pressure control for maintaining a zero-slip engaged state in which a minute slip of the lock-up clutch 2a is allowed instead of a clutch differential pressure control for maintaining a complete engaged state.

The lubrication solenoid 22 has a function of generating a valve operation signal pressure to the lubrication pressure regulating valve 65 and a switching pressure to the boost switching valve 66, and adjusting a lubrication flow rate to be supplied to the friction elements to an appropriate flow rate for preventing heat generation. The lubrication solenoid 22 is also a solenoid that mechanically guarantees a minimum lubrication flow rate for preventing heat generation of the friction elements in a case other than a continuous shift protection, and that adjusts a lubrication flow rate added to the minimum lubrication flow rate.

The lubrication pressure regulating valve 65 can control a lubrication flow rate, that is to be supplied to a power train (PT) including the friction elements and the gear train 3a via a cooler 69, according to the valve operation signal pressure from the lubrication solenoid 22. Further, the lubrication pressure regulating valve 65 reduces frictions by optimizing the lubrication flow rate supplied to the PT.

The boost switching valve 66 increases, according to the switching pressure from the lubrication solenoid 22, an amount of oil supplied to the centrifugal cancel chambers of the second clutch K2 and the third clutch K3. This boost switching valve 66 is used to temporarily increase the amount of oil supplied in a scene where the amount of oil in the centrifugal cancel chambers is insufficient.

The P-nP switching valve 67 switches a line pressure path to the park hydraulic actuator 68 according to the switching pressure from the lubrication solenoid 22 (or a park solenoid). A parking lock in which the park gear 3b is meshed when the P range is selected and a parking lock cancellation in which meshing of the park gear 3b is cancelled from the P range when a range other than the P range is selected are performed.

In this way, the control valve unit 6 is configured to eliminate a manual valve mechanically connected to a shift lever to be operated by a driver for switching among a D-range pressure oil path, an R-range pressure oil path, a P-range pressure oil path, and the like. When the D range, the R range, and the N range are selected by the shifter 181, the "shift-by-wire" is implemented by adopting a control in which the six friction elements are independently engaged or disengaged based on the range position signal from the shifter control unit 18. Further, when the P range is selected by the shifter 181, the "park-by-wire" is implemented by operating, based on the range position signal from the shifter control unit 18, the P-nP switching valve 67 and the park hydraulic actuator 68 that constitute a park module.

Figure 6:
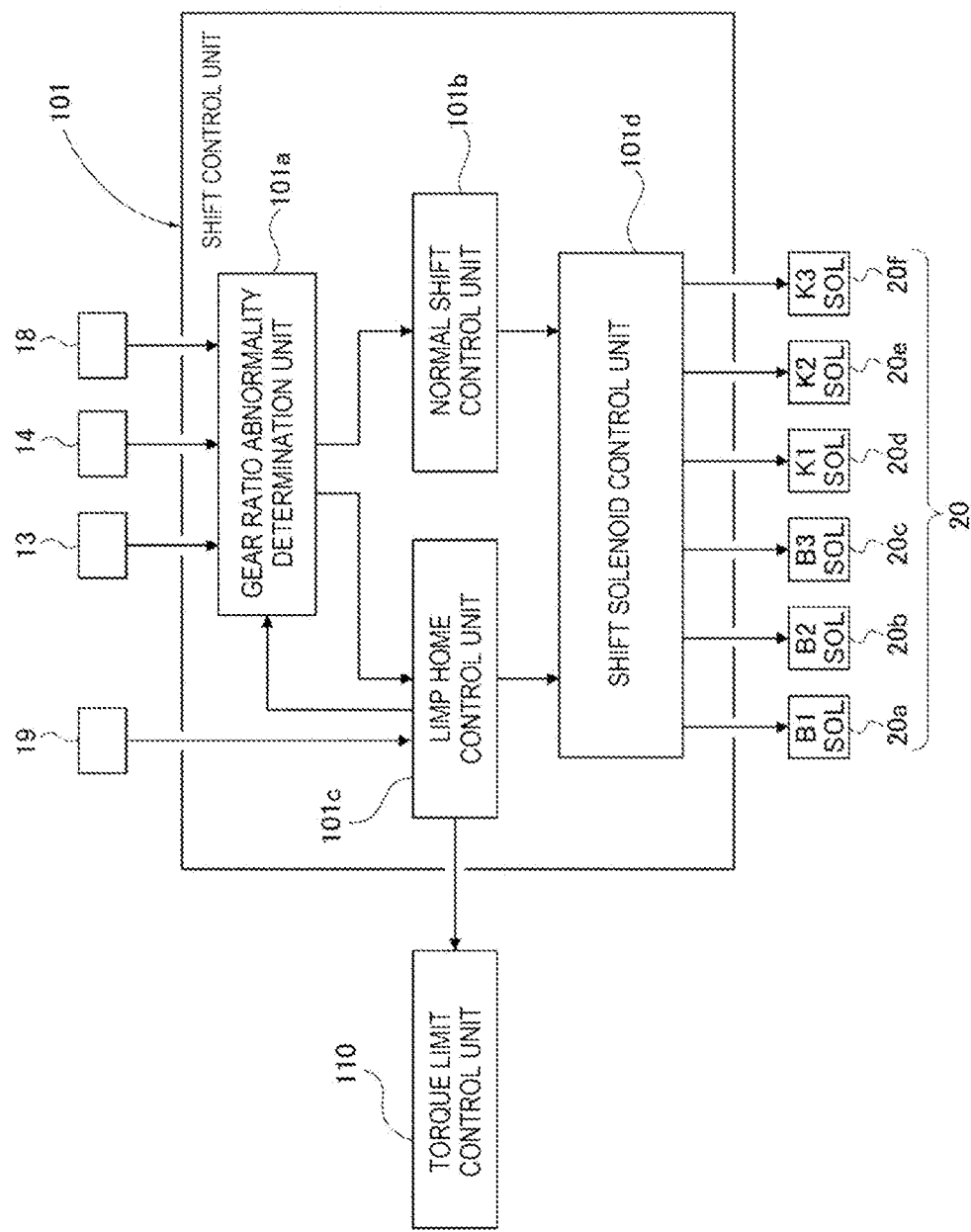
FIG. 6 is a block diagram showing a detailed configuration of a shift control unit of a transmission control unit.

Detailed Configuration of Shift Control Unit (FIG. 6)

Hereinafter, the detailed configuration of the shift control unit 101 of the transmission control unit 10 will be described with reference to FIG. 6. As shown in FIG. 6, the shift control unit 101 includes a gear ratio abnormality determination unit 101a, a normal shift control unit 101b, a limp home control unit 101c, and a shift solenoid control unit 101d.

The gear ratio abnormality determination unit 101a determines a gear ratio abnormality of the gear train 3a during forward travelling at any of the first to ninth speed gear positions. Information on the turbine rotation speed Nt from the turbine rotation sensor 13, the output shaft rotation speed No from the output shaft rotation sensor 14, and a selected range position from the shifter control unit 18 is input to the gear ratio abnormality determination unit 101a. During forward travelling at a predetermined gear position in the D range, an actual gear ratio is calculated according to the transmission input shaft rotation speed (the turbine rotation speed Nt) and a transmission output shaft rotation speed (the output shaft rotation speed No). Further, when a difference between the calculated actual gear ratio and a set gear ratio at the predetermined gear position at that time is less than a set value, it is determined that the gear ratio is normal; and when the difference between the calculated actual gear ratio and the set gear ratio at the predetermined gear position at that time is equal to or greater than the set value, it is determined that the gear ratio is abnormal.

Here, the "set value" is given according to a gear ratio abnormality determination threshold value obtained by subtracting/adding H % with respect to the set gear ratio in a normal state at the predetermined gear position. In a "determination of a gear ratio abnormality", a time, during which the difference between the actual gear ratio and the set gear ratio is equal to or greater than the set value, is accumulated during the in-gear state except for a shift transition period, and when the accumulated time is equal to or greater than a gear ratio abnormality confirmation timer time, it is determined that the gear ratio abnormality is confirmed. That is, the above determination is to prevent an erroneous determination of the gear ratio abnormality due to the instantaneous deviation of the actual gear ratio from the set gear ratio, and an accurate meaning of the "determination of the gear ratio abnormality" described below refers to that an abnormality confirmation of the gear ratio abnormality is determined when an accumulated time of the gear ratio abnormality is equal to or greater than the gear ratio abnormality determination timer time.

While receiving a determination result that the gear ratio is normal from the gear ratio abnormality determination unit 101a, the normal shift control unit 101b executes a normal shift control for performing upshift and downshift according to the operating point (VSP, APO) at that time and the shift map shown in FIG. 4. In the normal shift control, an engagement/disengagement command for six clutch solenoids 20a, 20b, 20c, 20d, 20e, and 20f at each gear position is determined according to the engagement table shown in FIG. 3, and the determined engagement/disengagement command is output to the shift solenoid control unit 101d. 20a is a first brake solenoid, 20b is a second brake solenoid, 20c is a third brake solenoid, 20d is a first clutch solenoid, 20e is a second clutch solenoid, and 20f is a third clutch solenoid.

When receiving a determination result that the gear ratio is abnormal based on the gear ratio abnormality confirmation, from the gear ratio abnormality determination unit 101a, the limp home control unit 101c executes a limp home control corresponding to the gear ratio abnormality. In the limp home control, when the determination result that the gear ratio is abnormal is received, a disengagement instruction for disengaging all of the six clutch solenoids 20a, 20b, 20c, 20d, 20e, and 20f is output. Further, when it is confirmed that the state is shifted to a neutral state according to the output of the disengagement instruction, engagement/disengagement of the first brake B1 (a specific friction element) that fixes the intermediate shaft to the transmission case TC, among the six friction elements, is determined based on rotation/stop information from the intermediate shaft rotation sensor 19 of the gear train 3a. Next, an evacuation gear position is determined based on determination information on the engagement/disengagement of the first brake B1, and a command for shifting from the gear position at that time to the determined evacuation gear position is output to the shift solenoid control unit 101d.

After the gear position is shifted to the evacuation gear position, during a forward travelling at the evacuation gear position, the gear ratio abnormality determination unit 101a again determines a gear ratio abnormality at the evacuation gear position based on a difference between the actual gear ratio and a set gear ratio at the evacuation gear position. Further, when the gear ratio abnormality at the evacuation gear position is determined by the gear ratio abnormality determination unit 101a and a disengagement failure element is estimated, the limp home control unit 101c changes the evacuation gear position to a second evacuation gear position based on the estimation of the disengagement failure element, and shifts the gear position to the second evacuation gear position. On the other hand, when the gear ratio abnormality at the evacuation gear position is determined by the gear ratio abnormality determination unit 101a but the disengagement failure element is not estimated, the limp home control unit 101c determines a function abnormality of a line pressure control, and outputs a request for limiting an upper limit torque of the engine 1 to the torque limit control unit 110.

Here, the limp home control unit 101c determines whether the gear position, which is selected when the gear ratio abnormality is determined during the forward travelling, is an eighth speed gear position or a ninth speed gear position (a first position) which is established with the first brake B1 in an engaged state. When the gear ratio abnormality is determined during travelling in the eighth speed gear position or the ninth speed gear position, instead of being shifted to the neutral state, the gear position is shifted to a determined gear position in the following manner: in a case of the eighth speed gear position, the evacuation gear position is determined to be a third speed gear position; and in a case of the ninth speed gear position, the evacuation gear position is determined to be a second speed gear position. A reason for determining the third speed gear position as the evacuation gear position in the case of the eighth speed gear position is that, as shown in FIG. 3, a combination relationship of the engagement/disengagement of the plurality of friction elements in the eighth speed gear position is inverse to that in the third speed gear position, and the third speed gear position can be established even when any of the friction elements is erroneously engaged or erroneously disengaged in the eighth speed gear position. A reason for determining the second speed gear position as the evacuation gear position in the case of the ninth speed gear position is that, as shown in FIG. 3, a combination relationship of the engagement/disengagement of the plurality of friction elements in the ninth speed gear position is inverse to that in the second speed gear position, and the second speed gear position can be established even when any of the friction elements is erroneously engaged or erroneously disengaged in the ninth speed gear position.

The shift solenoid control unit 101d outputs the engagement/disengagement command to the six clutch solenoids 20a, 20b, 20c, 20d, 20e, and 20f based on a command from the normal shift control unit 101b or the limp home control unit 101c. The shift solenoid control unit 101d outputs, to the clutch solenoids 20 (the shift solenoids), an intermediate pressure command corresponding to the input torque capable of preventing the clutch slippage by using the line pressure PL as a source pressure during the in-gear state in which the engaged state of the three friction elements is maintained at each gear position.

Figure 7:
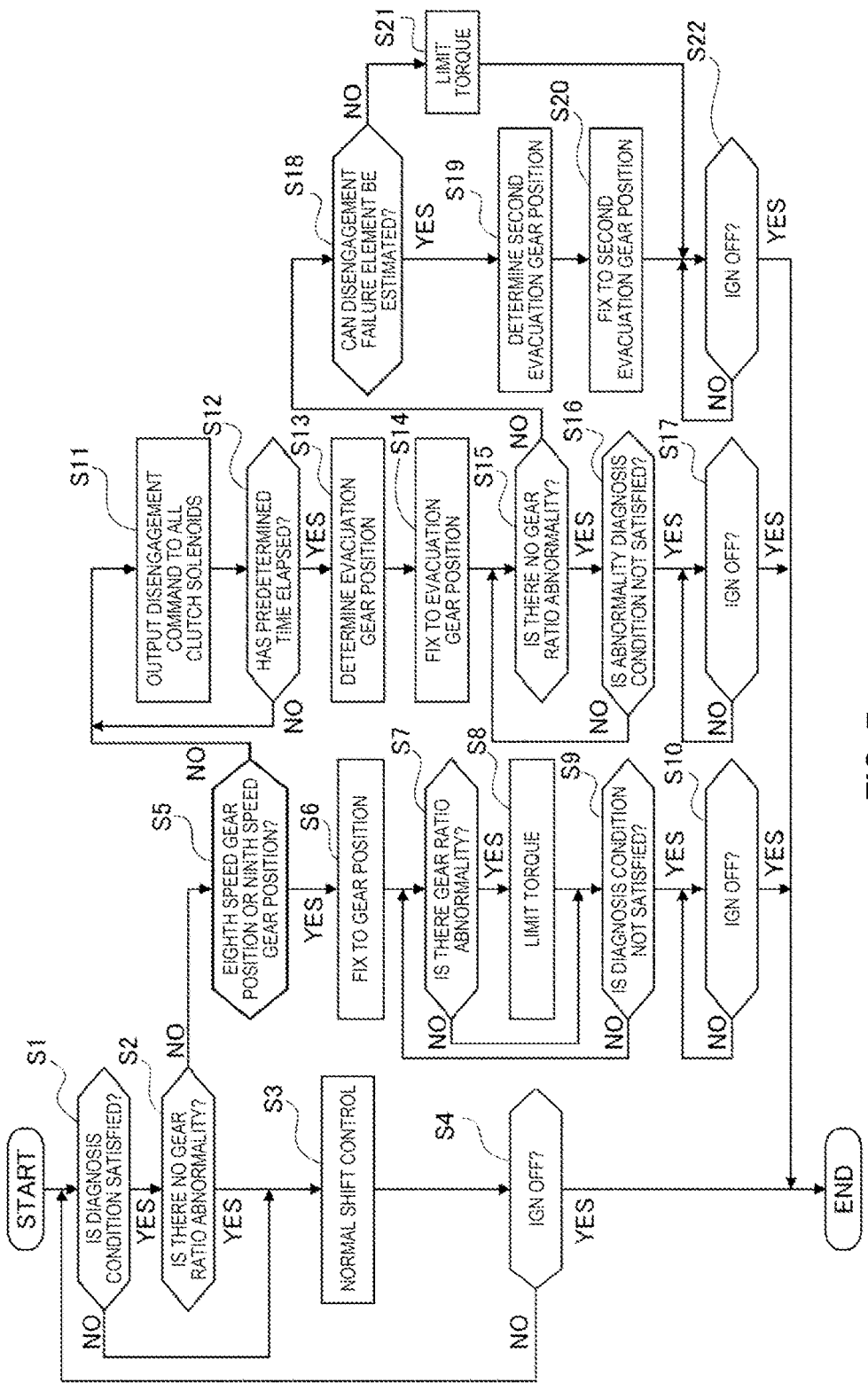
FIG. 7 is a flowchart showing a flow of a shift control process which is executed by a gear ratio abnormality determination unit and a limp home control unit of the shift control unit when there is a function abnormality in a shift solenoid.

Configuration of Shift Control Process (FIG. 7)

Hereinafter, the configuration of the shift control process executed by the shift control unit 101 of the transmission control unit 10 will be described with reference to FIG. 7. The shift control process in FIG. 7 is started by an ignition-on operation.

In step S1, after the process starts, it is determined whether an abnormality diagnosis condition for the shift solenoid is satisfied. In a case of YES (the diagnosis condition is satisfied), the process proceeds to step S2, and in a case of NO (the diagnosis condition is not satisfied), the process proceeds to step S3. Here, regarding the abnormality diagnosis condition for the shift solenoid, when diagnosis prohibition conditions are not satisfied and diagnosis permission conditions are satisfied, it is determined that the diagnosis condition is satisfied. The diagnosis prohibition conditions include conditions such as a turbine rotation sensor abnormality, a vehicle speed sensor abnormality, and a line pressure solenoid electric abnormality. The diagnosis permission conditions include conditions such as the gear position is other than the P, R, and N ranges, a vehicle speed is a predetermined vehicle speed or higher, a turbine rotation speed is a predetermined value or higher, and an engine rotation speed is a predetermined value or higher. Further, it is determined that the diagnosis condition is not satisfied even when one of the diagnosis prohibition conditions is satisfied, or one of the diagnosis permission conditions is not satisfied.

In step S2, following the determination in S1 that the diagnosis condition is satisfied, it is determined whether there is no gear ratio abnormality at the gear position selected at that time. In a case of YES (without gear ratio abnormality), the process proceeds to step S3, and in a case of NO (with gear ratio abnormality), the process proceeds to step S5. Here, "without gear ratio abnormality" refers to a situation where it is not determined that the gear ratio abnormality is confirmed. That is, the "without gear ratio abnormality" refers to a situation where, during the in-gear state, a gear ratio difference between the actual gear ratio and the set gear ratio at the gear position selected at that time is less than the set value, or a situation where, even when the gear ratio difference is equal to or greater than the set value, the accumulated time does not reach the gear ratio abnormality determination timer time. In addition, when it is determined that there is a gear ratio abnormality, an alarm, a display, or an announcement indicating an abnormality of the shift solenoid is given to urge a driver to take an action in response to the abnormality of the shift solenoid.

In step S3, following the determination in S1 that the diagnosis condition is not satisfied or the determination in S2 that there is no gear ratio abnormality, the normal shift control for performing the upshift and downshift is executed according to the operating point (VSP, APO) at that time and the shift map shown in FIG. 4, and the process proceeds to step S4.

In step S4, following the normal shift control process in S3, it is determined whether the ignition switch is turned off. In a case of YES (IGN OFF), the process proceeds to the end, and in a case of NO (IGN ON), the process returns to step S1.

In step S5, following the determination in S2 that there is a gear ratio abnormality, it is determined whether the gear position, at the time when the gear ratio abnormality is determined, is the eighth speed gear position or the ninth speed gear position. In a case of YES (the eighth or ninth speed gear position), the process proceeds to step S6, and in a case of NO (the first to seventh speed gear positions), the process proceeds to step S11. Here, the gear position, at the time when the gear ratio abnormality is determined, is determined based on information on a target gear position set in the normal shift control or the like.

In step S6, following the determination in step S5 that the gear position is the eighth or ninth speed gear position, the gear position is fixed to the third speed gear position in the case of the eighth speed gear position, and is fixed to the second speed gear position in the case of the ninth speed gear position, and the process proceeds to step S7. In the case of the eighth speed gear position, the evacuation gear position is determined to be the third speed gear position, and a control is performed such that the gear position is shifted to the third speed gear position which is determined based on the eighth speed gear position, and then the gear position is fixed to the third speed gear position. Meanwhile, in the case of the ninth speed gear position, the evacuation gear position is determined to be the second speed gear position, and a control is performed such that the gear position is shifted to the second speed gear position which is determined based on the ninth speed gear position, and then the gear position is fixed to the second speed gear position.

In step S7, following the fixing to the third speed gear position or the second speed gear position in S6, or the determination in S9 that the diagnosis condition is satisfied, it is determined whether there is a gear ratio abnormality in the third speed gear position or second speed gear position selected at that time. In a case of YES (with gear ratio abnormality), the process proceeds to step S8, and in a case of NO (without gear ratio abnormality), the process proceeds to step S9.

In step S8, following the determination in S7 that there is a gear ratio abnormality, a request for limiting the upper limit torque of the engine 1 is output to the torque limit control unit 110, and the process proceeds to step S9. Here, a reason for limiting the upper limit torque of the engine 1 is that, when the gear ratio abnormality occurs in spite of an evacuation to the third speed gear position or second speed gear position in which there is no concern about a disengagement failure, reduction in the line pressure PL is assumed as a cause, and thus the abnormality is handled as a function abnormality of the line pressure solenoid 21.

In step S9, following the determination in S7 that there is no gear ratio abnormality, or the torque limitation in S8, it is determined whether the abnormality diagnosis condition for the shift solenoid is not satisfied. In a case of YES (the diagnosis condition is not satisfied), the process proceeds to step S10, and in a case of NO (the diagnosis condition is satisfied), the process returns to step S7.

In step S10, following the determination in S9 that the diagnosis condition is not satisfied, it is determined whether the ignition switch is turned off. In a case of YES (IGN OFF), the process proceeds to the end, and in a case of NO (IGN ON), the determination in step S10 is repeated while the gear position fixed state or (gear position fixed+torque limited) is maintained.

In step S11, following the determination in S5 that the gear position is one of the first to seventh speed gear positions, or the determination in S12 that a predetermined time has not elapsed, the disengagement command is output to all of the clutch solenoids 20, and the process proceeds to step S12. A reason for outputting the disengagement command to all of the clutch solenoids 20 is to shift the gear train 3a to the neutral state.

In step S12, following the output of the disengagement command to all of the clutch solenoids 20 in S11, it is determined whether a predetermined time has elapsed from the start of the output of the disengagement command. In a case of YES (the predetermined time has elapsed), the process proceeds to step S13, and in a case of NO (the predetermined time has not elapsed), the process returns to step S11. Here, the "predetermined time" is set, in consideration of a delay in hydraulic pressure response, to a necessary time required from the output of the disengagement command to all of the clutch solenoids 20 to when a disengagement operation of the six friction elements is completed and the gear train 3a is shifted to the neutral state.

In step S13, following the determination in S12 that the predetermined time has elapsed, the evacuation gear position is determined based on the determination information on the engagement/disengagement of the first brake B1 that fixes the intermediate shaft to the transmission case TC, and the process proceeds to step S10. Here, the determination of the evacuation gear position is performed separately depending on whether the first brake B1 is erroneously engaged or the first brake B1 is not erroneously engaged, in each of the first to seventh speed gear positions. When the first brake B1 is erroneously engaged in one of the first to seventh speed gear positions, the eighth speed gear position established by the engagement of the first brake B1 is determined as the evacuation gear position. When the first brake B1 is not erroneously engaged in any of the first to seventh speed gear positions, the disengagement failure element is estimated, and a different gear position for each of the first to seventh speed gear positions is determined as the evacuation gear position.

In step S14, following the determination of the evacuation gear position in S13, the gear position is fixed to the determined evacuation gear position, and the process proceeds to step S11. For example, when the first brake B1 is not erroneously engaged in the first-speed gear position, the evacuation gear position is determined to be the fifth speed gear position, and a control is performed such that the gear position is shifted from the first-speed gear position to the determined fifth speed gear position, and the gear position is fixed to the fifth speed gear position.

In step S15, following the fixing to the evacuation gear position in S14, or the determination in S16 that the diagnosis condition is satisfied, it is determined whether there is no gear ratio abnormality in the fixed evacuation gear position. In a case of YES (without gear ratio abnormality), the process proceeds to step S16, and in a case of NO (with gear ratio abnormality), the process proceeds to step S18.

In step S16, following the determination in S15 that there is no gear ratio abnormality, it is determined whether the abnormality diagnosis condition for the shift solenoid is not satisfied. In a case of YES (the diagnosis condition is not satisfied), the process proceeds to step S17, and in a case of NO (the diagnosis condition is satisfied), the process returns to step S15.

In step S17, following the determination in S16 that the diagnosis condition is not satisfied, it is determined whether the ignition switch is turned off. In a case of YES (IGN OFF), the process proceeds to the end, and in a case of NO (IGN ON), the determination in step S17 is repeated while a state of evacuation gear position fixed is maintained.

In step S18, following the determination in S15 that there is a gear ratio abnormality, it is determined whether the disengagement failure element can be estimated. In a case of YES (the disengagement failure element can be estimated), the process proceeds to step S19, and in a case of NO (the disengagement failure element cannot be estimated), the process proceeds to step S21.

In step S19, following the determination in S18 that the disengagement failure element can be estimated, the second evacuation gear position is determined based on the determination information on the engagement/disengagement of the first brake B1 that fixes the intermediate shaft to the transmission case TC and estimation information on the disengagement failure element obtained by a gear position shift operation, and the process proceeds to step S20. Here, similar to the determination of the evacuation gear position, the determination of the second evacuation gear position is performed separately depending on whether the first brake B1 is erroneously engaged or the first brake B1 is not erroneously engaged, for each of the first to seventh speed gear positions.

In step S20, following the determination of the second evacuation gear position in S19, the gear position is fixed to the determined second evacuation gear position, and the process proceeds to step S22. For example, in a case where the first brake B1 is not erroneously engaged in the first-speed gear position, when a gear ratio abnormality occurs in the fifth speed gear position which is the evacuation gear position, the second evacuation gear position is determined to be the sixth speed gear position, and a control is performed such that the gear position is shifted from the fifth speed gear position to the determined sixth speed gear position, and the gear position is fixe to the sixth speed gear position.

In step S21, following the determination in S18 that the disengagement failure element cannot be estimated, a request for limiting the upper limit torque of the engine 1 is output to the torque limit control unit 110, and the process proceeds to step S22. Here, the reason for limiting the upper limit torque of the engine 1 is that, when a gear ratio abnormality occurs in a situation where the gear position is fixed to the evacuation gear position and the disengagement failure element cannot be estimated, the reduction of the line pressure PL is assumed as a cause, and thus the abnormality is handled as a function abnormality of the line pressure solenoid 21.

In step S22, following the fixing to the second evacuation gear position in S20, or the torque limitation in S21, it is determined whether the ignition switch is turned off. In a case of YES (IGN OFF), the process proceeds to the end, and in a case of NO (IGN ON), the determination in step S22 is repeated while the second evacuation gear position fixed state or (evacuation gear position fixed+torque limited) is maintained.

Next, "Problems to be Solved and Solution to Problems" will be described. Further, an operation of the first embodiment will be described separately as "Operation of Shift Control Process", "Operation of Limp Home Control", and "Operation When Gear Ratio Abnormality Occurs during Travelling in Fifth Speed Gear Position".

Problems to be Solved and Solution to Problems

As a technique for determining an erroneous engagement of a shift clutch, the related-art technique disclosed in JP2010-151263A is known. The above publication discloses that, when a gear ratio is determined to be any of gear ratios of respective gear positions during a first predetermined time T1 from completion of a shift (for example, a 3th gear position→4th gear position shift), and an original gear ratio (4TH) is different from a calculated gear ratio (5TH), it is determined that a clutch C-3, which is to be disengaged, has an engagement fail.

However, in the above related-art technique, when an actual gear ratio does not match a set gear ratio of a predetermined gear position, that is, there is a gear ratio abnormality that the gear ratio deviates from a 4th speed gear ratio or a 5th speed gear ratio, a friction element that is erroneously engaged or erroneously disengaged among a plurality of friction elements cannot be specified. Therefore, there is a problem that when a gear ratio abnormality occurs, an evacuation gear position for a limp home destination cannot be determined, and it is impossible to shift to a limp home control and ensure a travelling performance of a vehicle while avoiding sudden deceleration caused by an erroneously engaged element.

Therefore, a solution is provided to apply a detection control for determining a gear ratio abnormality state in which the actual gear ratio does not match the set gear ratio of the predetermined gear position during the in-gear state where the predetermined gear position is maintained. However, there is a problem that even when the gear ratio abnormality state is determined by the detection control, it is difficult to specify an erroneous engagement failure element or an erroneous disengagement failure element. In particular, in order to improve fuel efficiency, an intermediate pressure clutch control is performed such that an intermediate pressure command corresponding to an input torque less than that of the maximum pressure command is output to clutch solenoids of each of the plurality of friction elements engaged in respective gear positions, and the engaged state is maintained. In this case, among the plurality of friction elements engaged at the predetermined gear position, a specific friction element (a fuse clutch) in which slippage occurs first becomes unspecified, and it is more difficult to specify the erroneous engagement failure element or the erroneous disengagement failure element.

There is a demand that, when the function abnormality of the shift solenoid occurs, the occurrence of the function abnormality of the shift solenoid is detected before a trouble occurs during vehicle travelling due to the erroneous engagement failure element or the like, a gear position for a limp home destination is determined based on the specification of the erroneous engagement failure element or the erroneous disengagement failure element, and further, it is desired that the gear position is shifted to the gear position for the limp home and the control is shifted to a limp home control for ensuring a vehicle travelling to a dealer, home, or the like.

As a result of verifying solutions to the above-mentioned problems and the above-mentioned demand, the present inventors have focused on the following points.
  (A) In a slippage engaged state in which no gear ratio abnormality is found even when there is an erroneously engaged element, the vehicle can travel without sudden deceleration, and in this state, vehicle travelling can be continued.
  (B) When it is determined that a gear ratio abnormality has occurred, since an interlock state may occur due to the erroneously engaged element, it is possible to avoid the sudden deceleration by immediately shifting to the neutral state when the gear ratio abnormality is determined.
  (C) When a rotation/stop situation of the rotation member is monitored on an assumption that all of the friction elements are in the disengaged state after shifting to the neutral state, the erroneously engaged element or the like can be specified, and the gear position for the limp home destination can be determined based on the element specification.

Based on the above-mentioned focused points, the following means to solve the problems is adopted. The transmission control unit 10 of the present disclosure includes the gear ratio abnormality determination unit 101a and the limp home control unit 101c. The gear ratio abnormality determination unit 101a is configured to determine that the gear ratio is abnormal when, during travelling at the predetermined gear position, the difference between the actual gear ratio calculated based on the transmission input shaft rotation speed and the transmission output shaft rotation speed and the set gear ratio at the predetermined gear position is equal to or greater than the set value. The limp home control unit 101c is configured to, when the gear ratio abnormality determination unit 101a determines that the gear ratio is abnormal, output a disengagement instruction for disengaging all of the plurality of friction elements B1, B2, B3, K1, K2, and K3. When it is confirmed that the state is shifted to the neutral state according to the output of the disengagement instruction, engagement/disengagement of the specific friction element B1 among the plurality of friction elements B1, B2, B3, K1, K2, and K3 is determined based on the rotation/stop information of the rotation member of the gear train 3a. The evacuation gear position is determined based on the determination information on the engagement/disengagement of the specific friction element B1, and the gear position is shifted to the determined evacuation gear position.

That is, when a gear ratio abnormality is determined by the gear ratio abnormality determination unit 101a, the disengagement instruction for disengaging all of the plurality of friction elements B1, B2, B3, K1, K2, and K3 is output. That is, when the gear ratio abnormality is determined, the gear train 3a may be brought into the interlock state due to the erroneously engaged element, and the vehicle may suddenly decelerate after the determination of the gear ratio abnormality. Correspondingly, by performing a control to immediately shift to the neutral state under the condition of the determination of the gear ratio abnormality regardless of whether sudden deceleration may occur or not, sudden deceleration due to the erroneously engaged element is avoided in advance.

When it is confirmed that the state is shifted to the neutral state, the engagement/disengagement of the specific friction element B1 among the plurality of friction elements B1, B2, B3, K1, K2, and K3 is determined based on the rotation/stop information of the rotation member of the gear train 3a. The evacuation gear position is determined based on the determination information on the engagement/disengagement of the specific friction element B1, and the gear position is shifted to the determined evacuation gear position. That is, by monitoring the rotation/stop situation of the rotation member on the assumption that all of the friction elements are in the disengaged state after shifting to the neutral state, the erroneously engaged element or the like can be specified. For example, when the rotation member, which is in a rotating state in the neutral state, is stopped, the friction element that fixes the rotation member to the case is specified as the erroneously engaged element. Further, it is possible to determine, based on the specification of the erroneously engaged element, a gear position for the limp home that is established by setting the erroneously engaged element to an engaged state, or a gear position candidate for the limp home that can be established by using the element as a normal disengagement element.

As a result, when there is a gear ratio abnormality in which the actual gear ratio deviates from the set gear ratio, it is possible to shift to the limp home control and ensure the travelling performance of the vehicle while avoiding sudden deceleration caused by the erroneously engaged element. In particular, during the in-gear state in which the engaged state of the friction elements is maintained, even in a case where the intermediate pressure command corresponding to the input torque capable of preventing the clutch slippage is output to the clutch solenoid 20, it is possible to perform specification of a failure element which is assumed difficult because the fuse clutch is unspecified.

Operation of Shift Control Process (FIG. 7)

An operation of the shift control process will be described based on a flowchart of FIG. 7. First, in an ignition-on state, while the abnormality diagnosis condition for the shift solenoid is not satisfied, a flow of S1→S3→S4 is repeated. In step S3, the normal shift control for performing the upshift and downshift is executed according to the operating point (VSP, APO) at that time and the shift map shown in FIG. 4. When the abnormality diagnosis condition for the shift solenoid is satisfied during travelling in the D range, the process proceeds from S1 to S2. In S2, it is determined whether there is no gear ratio abnormality in the gear position selected at that time. Further, while it is determined that there is no gear ratio abnormality, a flow of S1→S2→S3→S4 is repeated. In S3, the normal shift control is continuously executed.

Meanwhile, when an abnormality occurs in the shift solenoid and it is determined in S2 that occurrence of a gear ratio abnormality in the selected gear position at that time is confirmed, the process proceeds from S2 to S5 and the subsequent steps. At this time, when the gear position, at the time when the gear ratio abnormality is determined, is the eighth speed gear position or the ninth speed gear position, the process is executed from S5 to S10, and when the gear position, at the time when the gear ratio abnormality is determined, is any of the first to seventh speed gear positions, the process is executed from S11 to S22.

When the gear position, at the time when the gear ratio abnormality is determined, is the eighth speed gear position or the ninth speed gear position, the process proceeds from S5 to S6. In S6, the gear position is fixed to the third speed gear position in the case of the eighth speed gear position, and is fixed to the second speed gear position in the case of the ninth speed gear position. Further, when it is determined that there is no gear ratio abnormality in the third speed gear position which is the evacuation gear position of the eighth speed gear position or in the second speed gear position which is the evacuation gear position of the ninth speed gear position while the diagnosis condition remains satisfied in S9, a flow from S6 to S7→S9 is repeated, and a control of fixing to the third speed gear position or the second speed gear position is continued.

Meanwhile, when it is determined that there is a gear ratio abnormality in a state where the gear position is fixed to the third speed gear position evacuated from the eighth speed gear position or in a state where the gear position is fixed to the second speed gear position evacuated from the ninth speed gear position while the diagnosis condition remains satisfied in S9, the process proceeds from S7 to S8. In S8, a request for limiting the upper limit torque of the engine 1 is output to the torque limit control unit 110 while the third speed gear position fixed state or the second speed gear position fixed state is maintained. Then, when the diagnosis condition is not satisfied in S9, the process proceeds from S9 to S10, and when it is determined in S10 that the ignition is turned off, the process proceeds to the end.

That is, when the gear position, at the time when the gear ratio abnormality is determined, is the eighth speed gear position or the ninth speed gear position, a limp home control is executed such that, instead of being shifted to the neutral state, the gear position is shifted to a predetermined evacuation gear position (the second speed gear position or the third speed gear position) and is fixed to the evacuation gear position. Here, when there is no gear ratio abnormality in the fixed evacuation gear position (the second speed gear position or the third speed gear position), the fixing to the evacuation gear position is maintained until the ignition is turned off. When there is a gear ratio abnormality in the fixed evacuation gear position (the second speed gear position or the third speed gear position), the engine torque is limited in addition to the fixing to the evacuation gear position.

Next, when the gear position, at the time when the gear ratio abnormality is determined, is one of the first to seventh speed gear positions, the process proceeds from S5 to S11→S12, and a flow of S11→S12 is repeated until a predetermined time elapses. In S11, the disengagement command is output for all of the clutch solenoids 20. When the predetermined time has elapsed, the process proceeds from S12 to S13→S14→S15→S16. In S13, the evacuation gear position is determined based on the determination information on the engagement/disengagement of the first brake B1 that fixes the intermediate shaft to the transmission case TC. In S14, the gear position is fixed to the determined evacuation gear position. While it is determined in S16 that the diagnosis condition is satisfied, a flow of S15→S16 is repeated. In S15, it is determined whether there is no gear ratio abnormality in the fixed evacuation gear position. When it is determined in the next step S16 that the diagnosis condition is not satisfied while it is determined in S15 that there is no gear ratio abnormality, the process proceeds from S16 to S17, and when it is determined in S17 that the ignition is turned off, the process proceeds to the end.

That is, when the gear position, at the time when the gear ratio abnormality is determined, is one of the first to seventh speed gear positions, a limp home control is executed such that the gear position is shifted to the neutral state, then shifted from the neutral state to the evacuation gear position, and is fixed to the evacuation gear position. Further, when there is no gear ratio abnormality at the evacuation gear position, the evacuation gear position fixed state is maintained until the ignition is turned off.

When it is determined in S15 that there is a gear ratio abnormality, the process proceeds from S15 to S18. In S18, it is determined whether the disengagement failure element can be estimated. When it is determined in S18 that the disengagement failure element can be estimated, the process proceeds from S18 to S19→S20→S22. In S19, the second evacuation gear position is determined based on the determination information on the engagement/disengagement of the first brake B1 that fixes the intermediate shaft to the transmission case TC and the estimation information on the disengagement failure element obtained by the gear position shift operation. In S20, the gear position is fixed to the determined second evacuation gear position. Meanwhile, when it is determined in S18 that the disengagement failure element cannot be estimated, the process proceeds from S18 to S21→S22. In S21, a request for limiting the upper limit torque of the engine 1 is output to the torque limit control unit 110. When it is determined in S22 that the ignition is turned off, the process proceeds to the end.

That is, when the gear position, at the time when the gear ratio abnormality is determined, is one of the first to seventh speed gear positions, the gear position is shifted to the neutral state, then shifted from the neutral state to the evacuation gear position, and is fixed to the evacuation gear position. Then, when there is a gear ratio abnormality in the fixed evacuation gear position and the disengagement failure element can be estimated, a limp home control is executed, until the ignition is turned off, such that the gear position is shifted from the evacuation gear position to the second evacuation gear position, and then fixed to the second evacuation gear position. In addition, when there is a gear ratio abnormality in the fixed evacuation gear position and the disengagement failure element cannot be estimated, the gear position is not shifted to the second evacuation gear position, but a limp home control is executed, until the ignition is turned off, such that the gear position is fixed to the evacuation gear position, and the engine torque is limited.

Operation of Limp Home Control

An operation of the limp home control in a case where a gear ratio abnormality occurs will be described separately as: Gear Ratio Abnormality in Eighth Speed Gear Position or Ninth Speed Gear Position; Gear Ratio Abnormality (Erroneous Engagement of B1) in First to Seventh Speed Gear Positions; and Gear Ratio Abnormality (other than Erroneous Engagement of B1) in First to Seventh Speed Gear Positions.

<Gear Ratio Abnormality in Eighth Speed Gear Position or Ninth Speed Gear Position>

When the gear ratio abnormality occurs in the eighth speed gear position, a limp home control is performed in which control is shifted from third speed gear position fixing→gear ratio abnormality→torque limiting.

When the gear ratio abnormality occurs in the ninth speed gear position, a limp home control is performed in which control is shifted from second speed gear position fixing→gear ratio abnormality→torque limiting.

When the gear ratio abnormality occurs in the eighth speed gear position, the gear position is shifted to the third speed gear position in which the combination relationship of the engagement/disengagement of the six friction elements B1, B2, B3, K1, K2, and K3 is inverse to that in the eighth speed gear position as is clear from the engagement table shown in FIG. 3, and which can be established even when any of the friction elements is erroneously engaged or erroneously disengaged in the eighth speed gear position. When the gear ratio abnormality occurs in the ninth speed gear position, the gear position is shifted to the second speed gear position in which the combination relationship of the engagement/disengagement of the six friction elements B1, B2, B3, K1, K2, and K3 is inverse to that in the ninth speed gear position as is clear from the engagement table shown in FIG. 3, and which can be established even when any of the friction elements is erroneously engaged or erroneously disengaged in the ninth speed gear position. As described above, when the gear ratio abnormality occurs in the eighth speed gear position or the ninth speed gear position, an erroneously disengaged state and an erroneously engaged state cannot be distinguished, but a gear position for the limp home exists, the gear position is fixed to the third gear position in the case of the eighth speed gear position, and the gear position is fixed to the second speed gear position in the case of the ninth speed gear position.

Next, in a case where a gear ratio abnormality further occurs when an evacuation destination is fixed to the third speed gear position or the second speed gear position, the abnormality may be an erroneous disengagement failure or a line pressure solenoid abnormality. Correspondingly, in the case where a gear ratio abnormality further occurs when the gear position is fixed to the third speed gear position or the second speed gear position, the erroneous disengagement failure element cannot be estimated. Therefore, the torque limitation is performed as a countermeasure against the line pressure solenoid abnormality instead of changing the evacuation destination gear position.

<Gear Ratio Abnormality (Erroneous Engagement of B1) in First to Seventh Speed Gear Positions>

When the gear ratio abnormality (erroneous engagement of B1) occurs in the first-speed gear position, a limp home control is performed in which control is shifted from neutral state→eighth speed gear position fixing→gear ratio abnormality→ninth speed gear position fixing.

When the gear ratio abnormality (erroneous engagement of B1) occurs in the second speed gear position, the limp home control is performed in which control is shifted from neutral state→eighth speed gear position fixing→gear ratio abnormality→ninth speed gear position fixing.

When the gear ratio abnormality (erroneous engagement of B1) occurs in the third speed gear position, a limp home control is performed in which control is shifted from neutral state→eighth speed gear position fixing→gear ratio abnormality→torque limiting.

When the gear ratio abnormality (erroneous engagement of B1) occurs in the fourth speed gear position, a limp home control is performed in which control is shifted from neutral state→eighth speed gear position fixing→gear ratio abnormality→third speed gear position fixing.

When the gear ratio abnormality (erroneous engagement of B1) occurs in the fifth speed gear position, the limp home control is performed in which control is shifted from neutral state→eighth speed gear position fixing→gear ratio abnormality→third speed gear position fixing.

When the gear ratio abnormality (erroneous engagement of B1) occurs in the sixth speed gear position, the limp home control is performed in which control is shifted from neutral state→eighth speed gear position fixing→gear ratio abnormality→third speed gear position fixing.

When the gear ratio abnormality (erroneous engagement of B1) occurs in the seventh speed gear position, the limp home control is performed in which control is shifted from neutral state→eighth speed gear position fixing→gear ratio abnormality→third speed gear position fixing.

As described above, when the gear ratio abnormality occurs in the first to seventh speed gear positions, unlike in the eighth speed gear position or the ninth speed gear position, there is no gear position for the limp home. Therefore, when there is no gear position for the limp home, the gear position is evacuated to the neutral state, and after the gear position is shifted to the neutral state, the detection control is performed using the sensor signal from the intermediate shaft rotation sensor 19. That is, in a case where the gear ratio abnormality occurs in the first to seventh speed gear positions, when the intermediate shaft rotation sensor 19 detects that the first brake B1 is erroneously engaged, the control is shifted to, of the fixing to the eighth speed gear position and the ninth speed gear position in which the first brake B1 is engaged, the fixing to the eighth speed gear position which is a low gear position.

Next, in a case where a gear ratio abnormality further occurs when the evacuation destination is fixed to the eighth speed gear position, the abnormality may be an erroneous disengagement failure or a line pressure solenoid abnormality. Correspondingly, when the gear ratio abnormality occurs in the first-speed gear position and the second speed gear position, the ninth speed gear position which can be selected as the evacuation destination is set as the second evacuation gear position. When the gear ratio abnormality occurs in the third speed gear position and a gear ratio abnormality further occurs in the fixing to the eighth speed gear position, the erroneous disengagement failure element cannot be estimated. Therefore, the torque limitation is performed as a countermeasure against the line pressure solenoid abnormality instead of changing the evacuation destination gear position. When the gear ratio abnormality occurs in the fourth to seventh speed gear positions, as the evacuation destination, the third speed gear position, which can be established even when any of the friction elements is erroneously engaged or erroneously disengaged in the eighth speed gear position, is set as the second evacuation gear position.

<Gear Ratio Abnormality (other than Erroneous Engagement of B1) in First to Seventh Speed Gear Positions>

When the gear ratio abnormality (other than the erroneous engagement of B1) occurs in the first-speed gear position, a limp home control is performed in which control is shifted from neutral state→fifth speed gear position fixing→gear ratio abnormality→sixth speed gear position fixing.

When the gear ratio abnormality (other than the erroneous engagement of B1) occurs in the second speed gear position, a limp home control is performed in which control is shifted from neutral state→fourth speed gear position fixing→gear ratio abnormality→fifth speed gear position fixing.

When the gear ratio abnormality (other than the erroneous engagement of B1) occurs in the third speed gear position, a limp home control is performed in which control is shifted from neutral state→sixth speed gear position fixing→gear ratio abnormality→seventh speed gear position fixing.

When the gear ratio abnormality (other than the erroneous engagement of B1) occurs in the fourth speed gear position, a limp home control is performed in which control is shifted from neutral state→sixth speed gear position fixing→gear ratio abnormality→third speed gear position fixing.

When the gear ratio abnormality (other than the erroneous engagement of B1) occurs in the fifth speed gear position, a limp home control is performed in which control is shifted from neutral state→second speed gear position fixing→gear ratio abnormality→first-speed gear position fixing.

When the gear ratio abnormality (other than the erroneous engagement of B1) occurs in the sixth speed gear position, a limp home control is performed in which control is shifted from neutral state→fourth speed gear position fixing→gear ratio abnormality→third speed gear position fixing.

When the gear ratio abnormality (other than the erroneous engagement of B1) occurs in the seventh speed gear position, a limp home control is performed in which control is shifted from neutral state→third speed gear position fixing→gear ratio abnormality→second speed gear position fixing.

As described above, in a case where the gear ratio abnormality occurs in the first to seventh speed gear positions, when the intermediate shaft rotation sensor 19 detects that the first brake B1 is not erroneously engaged, as in the case where the first brake B1 is erroneously engaged, the gear position is temporarily evacuated to the neutral state. Further, after the gear position is shifted to the neutral state, as will be described below, the gear position is shifted to a gear position, that can be established, as the evacuation gear position and the second evacuation gear position based on the estimation of the disengagement failure element at each gear position.

When the gear ratio abnormality (other than the erroneous engagement of B1) occurs in the first-speed gear position (K1 and K2 are in a disengaged state), as is clear from the engagement table of FIG. 3, gear positions that can be evacuated to are the fifth speed gear position and the sixth speed gear position, in which the first clutch K1 and the second clutch K2 are in an engaged state. Therefore, the fifth speed gear position is set as the evacuation gear position, and the sixth speed gear position is set as the second evacuation gear position.

When the gear ratio abnormality (other than the erroneous engagement of B1) occurs in the second speed gear position (B3 and K1 are in a disengaged state), as is clear from the engagement table of FIG. 3, gear positions that can be evacuated to are the fourth speed gear position, the fifth speed gear position, the seventh speed gear position, and the ninth speed gear position, in which the third brake B3 and the first clutch K1 are in an engaged state. Therefore, the fourth speed gear position is set as the evacuation gear position, and the fifth speed gear position is set as the second evacuation gear position.

When the gear ratio abnormality (other than the erroneous engagement of B1) occurs in the third speed gear position (K1 and K3 are in a disengaged state), as is clear from the engagement table of FIG. 3, gear positions that can be evacuated to are the sixth speed gear position, the seventh speed gear position, and the eighth speed gear position, in which the first clutch K1 and the third clutch K3 are in an engaged state. Therefore, the sixth speed gear position is set as the evacuation gear position, and the seventh speed gear position is set as the second evacuation gear position.

When the gear ratio abnormality (other than the erroneous engagement of B1) occurs in the fourth speed gear position (K2 and K3 are in a disengaged state), as is clear from the engagement table of FIG. 3, gear positions that can be evacuated to are the second speed gear position and the sixth speed gear position, in which the second clutch K2 and the third clutch K3 are in an engaged state. Therefore, the sixth speed gear position is set as the evacuation gear position. The third speed gear position is set as the second evacuation gear position. In the third speed gear position, the second brake B2 and the third brake B3, which are in the disengaged state in the sixth speed gear position, are in the engaged state.

When the gear ratio abnormality (other than the erroneous engagement of B1) occurs in the fifth speed gear position (B2 and K3 are in a disengaged state), as is clear from the engagement table of FIG. 3, gear positions that can be evacuated to are the first-speed gear position and the second speed gear position, in which the second brake B2 and the third clutch K3 are in an engaged state. Therefore, the second speed gear position is set as the evacuation gear position, and the first-speed gear position is set as the second evacuation gear position.

When the gear ratio abnormality (other than the erroneous engagement of B1) occurs in the sixth speed gear position (B2 and B3 are in a disengaged state), as is clear from the engagement table of FIG. 3, gear positions that can be evacuated to are the first-speed gear position, the third speed gear position, and the fourth speed gear position, in which the second brake B2 and the third brake B3 are in an engaged state. Therefore, the fourth speed gear position is set as the evacuation gear position, and the third speed gear position is set as the second evacuation gear position.

When the gear ratio abnormality (other than the erroneous engagement of B1) occurs in the seventh speed gear position (B2 and K2 are in a disengaged state), as is clear from the engagement table of FIG. 3, gear positions that can be evacuated to are the second speed gear position and the third speed gear position, in which the second brake B2 and the second clutch K2 are in an engaged state. Therefore, the third speed gear position is set as the evacuation gear position, and the second speed gear position is set as the second evacuation gear position.

[Operation when Gear Ratio Abnormality Occurs During Travelling in Fifth Speed Gear Position (FIGS. 8 and 9)]

Figure 8:
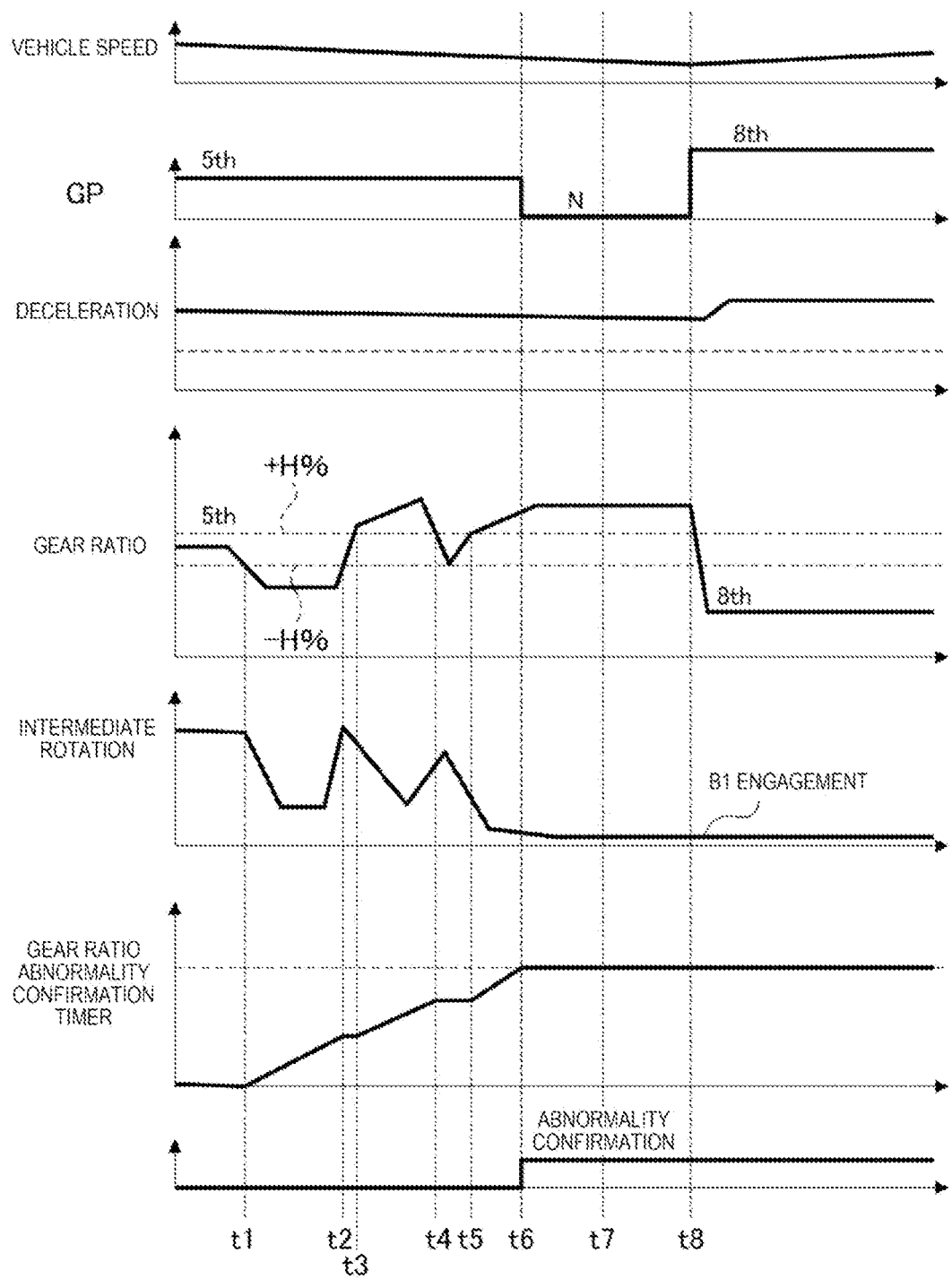
FIG. 8 is a time chart showing a shift operation of a fifth speed gear position→a neutral position→an eighth speed gear position when it is determined that there is a gear ratio abnormality caused by an erroneous engagement of a first brake during travelling in the fifth speed gear position.

A shift operation of the fifth speed gear position→the neutral position→the eighth speed gear position, at a time when it is determined that there is a gear ratio abnormality caused by an erroneous engagement of the first brake B1 during travelling in the fifth speed gear position, will be described with reference to a time chart shown in FIG. 8.

For example, when the actual gear ratio exceeds a threshold value obtained by subtracting H % from the set gear ratio in the fifth speed gear position at a time t1 during deceleration in the D-range fifth speed, and a gear ratio abnormality occurs, an accumulated time of the gear ratio abnormality exceeding a threshold value, which is obtained by subtracting/adding H %, from the time t1 is calculated. That is, an elapsed time from the time t1 to a time t2, an elapsed time from a time t3 to a time t4, and an elapsed time from a time t5 are added. Then, at a time t6, when the accumulated time of the gear ratio abnormality reaches the gear ratio abnormality confirmation timer, it is determined that the gear ratio abnormality is confirmed.

Therefore, at the time t6, the disengagement command is output to all of the six clutch solenoids 20a, 20b, 20c, 20d, 20e, and 20f, and the gear position is shifted from the fifth speed gear position to the neutral state. Further, at a time t7 when a predetermined time has elapsed from the time t6, the shift to the neutral state is confirmed. From the time t7, intermediate shaft rotation (=intermediate rotation) is monitored based on the intermediate shaft rotation sensor 19, and when a state in which an intermediate rotation speed=0 continues until a time t8 at which a predetermined time has elapsed from the time t7, it is determined at the time t8 that the first brake B1 is erroneously engaged.

As described above, since it is determined that the first brake B1 is erroneously engaged after the gear position is shifted to the neutral state due to the occurrence of the gear ratio abnormality during the deceleration in the fifth speed gear position, the gear position is shifted, at the time t8, from the neutral state to the eighth speed gear position which is the evacuation gear position, and then the gear position is fixed to the eighth speed gear position. Therefore, after the time t8, the eighth speed gear position in which the first brake B1 is in the engaged state is fixed as the evacuation gear position, and a limp home travelling of the vehicle is ensured.

Figure 9:
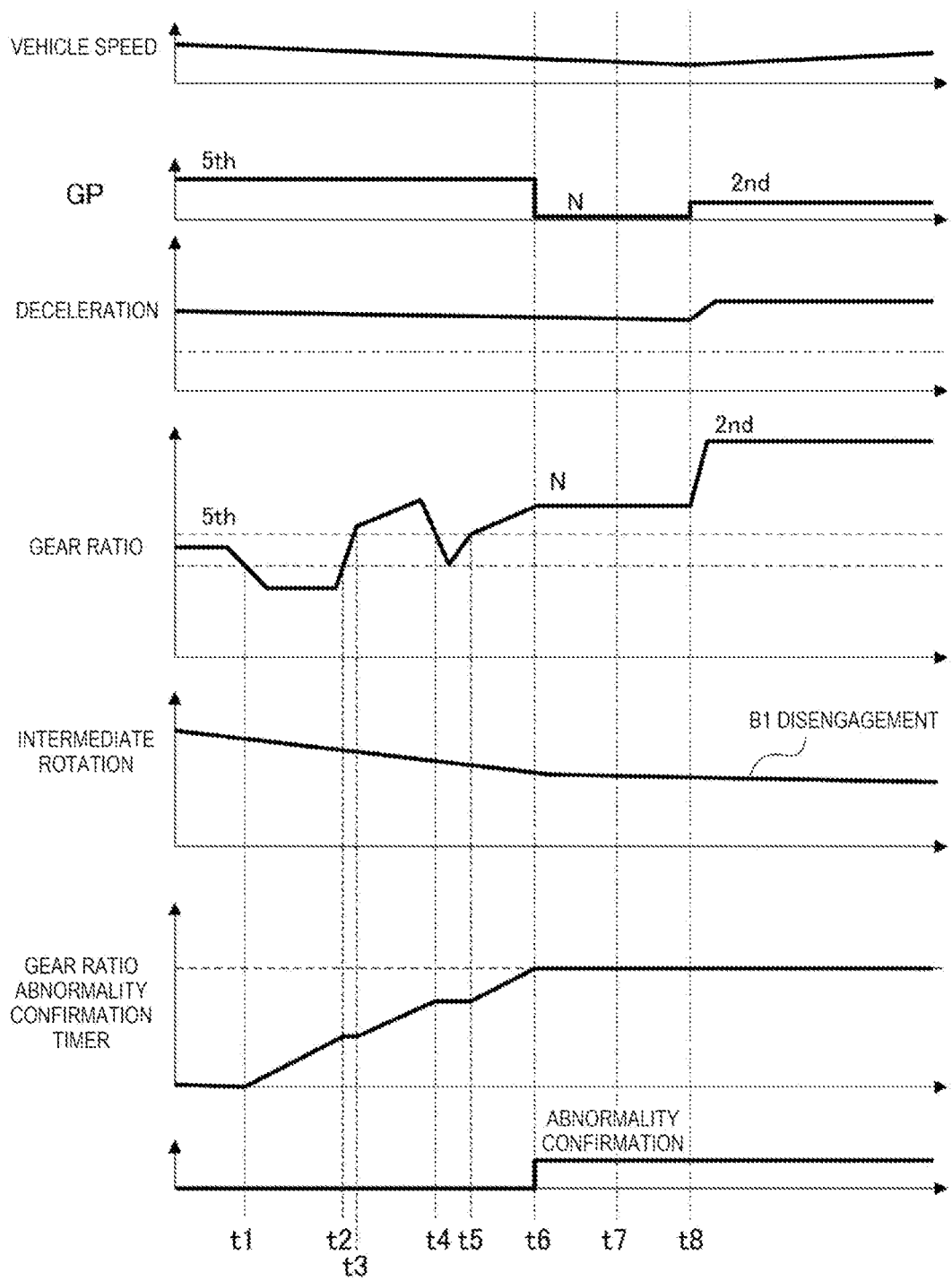
FIG. 9 is a time chart showing a shift operation of a fifth speed gear position→a neutral position→a second speed gear position when it is determined that there is a gear ratio abnormality caused by an abnormality other than the erroneous engagement of the first brake during travelling in the fifth speed gear position.

Next, a shift operation of the fifth speed gear position-→the neutral position→the second speed gear position, at a time when it is determined that there is a gear ratio abnormality caused by an abnormality other than the erroneous engagement of the first brake B1 during travelling in the fifth speed gear position, will be described with reference to a time chart shown in FIG. 9.

For example, when the actual gear ratio exceeds a threshold value obtained by subtracting H % from the set gear ratio in the fifth speed gear position at a time t1 during deceleration in the D-range fifth speed, and a gear ratio abnormality occurs, an accumulated time of the gear ratio abnormality exceeding a threshold value, which is obtained by subtracting/adding H %, from the time t1 is calculated. That is, an elapsed time from the time t1 to a time t2, an elapsed time from a time t3 to a time t4, and an elapsed time from a time t5 are added. Then, at a time t6, when the accumulated time of the gear ratio abnormality reaches the gear ratio abnormality confirmation timer, it is determined that the gear ratio abnormality is confirmed.

Therefore, at the time t6, the disengagement command is output to all of the six clutch solenoids 20a, 20b, 20c, 20d, 20e, and 20f, and the gear position is shifted from the fifth speed gear position to the neutral state. Further, at a time t7 when a predetermined time has elapsed from the time t6, the shift to the neutral state is confirmed. From the time t7, an intermediate shaft rotation (=intermediate rotation) is monitored based on the intermediate shaft rotation sensor 19, and when a state in which an intermediate rotation speed >0 continues until a time t8 at which a predetermined time has elapsed from the time t7, it is determined at the time t8 that the first brake B1 is disengaged.

As described above, since it is determined that the first brake B1 is disengaged after the gear position is shifted to the neutral state due to the occurrence of the gear ratio abnormality during the deceleration in the fifth speed gear position, the gear position is shifted, at the time t8, from the neutral state to the second speed gear position which is the evacuation gear position, and then the gear position is fixed in the second speed gear position. Therefore, after the time t8, the second speed gear position in which the first brake B1 is in the disengaged state is fixed as the evacuation gear position, and a limp home travelling of the vehicle is ensured.

As described above, the control device for the automatic transmission 3 of the first embodiment exerts the effects listed below.

(1) The control device for the automatic transmission 3 is provided with the transmission control unit 10 configured to control the shift solenoids (the clutch solenoids 20a, 20b, 20c, 20d, 20e, and 20f) provided for a plurality of friction elements B1, B2, B3, K1, K2, and K3 of a stepped transmission mechanism, and perform a shift control in which a plurality of gear positions are switched by changing engaged states of the plurality of friction elements. The transmission control unit 10 includes the gear ratio abnormality determination unit 101a and the limp home control unit 101c.

The gear ratio abnormality determination unit 101a is configured to determine that a gear ratio is abnormal when, during travelling at a predetermined gear position, a difference between an actual gear ratio, which is calculated based on a transmission input shaft rotation speed and a transmission output shaft rotation speed, and a set gear ratio at the predetermined gear position is equal to or greater than a set value.

The limp home control unit 101c is configured to, when the gear ratio abnormality determination unit 101a determines that the gear ratio is abnormal, output a disengagement instruction for disengaging all of the plurality of friction elements, when it is confirmed that a neutral state is shifted to according to the output of the disengagement instruction, determine engagement/disengagement of a specific friction element among the plurality of friction elements based on rotation/stop information of a rotation member of the stepped transmission mechanism, and determine an evacuation gear position based on determination information on the engagement/disengagement of the specific friction element, and shift the gear position to the determined evacuation gear position.

Therefore, when there is a gear ratio abnormality in which the actual gear ratio deviates from the set gear ratio, it is possible to shift to the limp home control and ensure the travelling performance of the vehicle while avoiding sudden deceleration caused by the erroneously engaged element.

(2) The rotation member of the stepped transmission mechanism (the gear train 3a) is an intermediate shaft (the first carrier C1) provided in the stepped transmission mechanism other than the transmission input shaft IN and the transmission output shaft OUT.

Engagement/disengagement of a friction element (the first brake B1) that fixes the intermediate shaft to the transmission case TC is determined based on rotation/stop information from the intermediate shaft rotation sensor 19 that detects rotation of the intermediate shaft.

Therefore, after the gear position is shifted to the neutral state due to gear ratio abnormality determination, erroneous engagement of the friction element (the first brake B1) can be determined based on stop information from the intermediate shaft rotation sensor 19. Further, disengagement of the friction element (the first brake B1) can be determined based on rotation information from the intermediate shaft rotation sensor 19.

(3) The gear ratio abnormality determination unit 101a is configured to determine that the gear ratio is abnormal when, during travelling at the evacuation gear position after the gear position is shifted to the evacuation gear position, a difference between the actual gear ratio, which is calculated based on the transmission input shaft rotation speed and the transmission output shaft rotation speed, and a set gear ratio at the evacuation gear position is equal to or greater than the set value.

The limp home control unit 101c is configured to, when the gear ratio abnormality at the evacuation gear position is determined by the gear ratio abnormality determination unit 101a and a disengagement failure element is estimated, change the evacuation gear position to a second evacuation gear position based on the estimation of the disengagement failure element, and shift to the second evacuation gear position.

Therefore, when the gear ratio abnormality is determined at the evacuation gear position, by shifting the gear position to the second evacuation gear position based on the estimation of the disengagement failure element, limp home performance can be ensured even when the gear ratio abnormality occurs due to a disengagement failure. That is, when the gear position is shifted to the evacuation gear position on suspicion of an erroneous engagement failure, but there is a disengagement failure element, a gear ratio abnormality may still occur at the evacuation gear position, and it is necessary to ensure the limp home performance even in the case of the disengagement failure when the gear ratio abnormality occurs.

(4) A travelling driving source controller (the engine control module 11) that controls a travelling driving source (the engine 1) connected to the transmission input shaft IN includes a torque limit control unit 110 configured to limit an upper limit torque of the travelling driving source in response to a request from the transmission control unit 10.

The gear ratio abnormality determination unit 101a is configured to determine that the gear ratio is abnormal when, during travelling at the evacuation gear position after the gear position is shifted to the evacuation gear position, a difference between the actual gear ratio, which is calculated based on the transmission input shaft rotation speed and the transmission output shaft rotation speed, and a set gear ratio at the evacuation gear position is equal to or greater than the set value.

The limp home control unit 101c is configured to, when the gear ratio abnormality at the evacuation gear position is determined by the gear ratio abnormality determination unit 101a and a disengagement failure element is not estimated, determine a function abnormality of line pressure control, and output a request for limiting the upper limit torque of the travelling driving source to the torque limit control unit 110.

Therefore, when the disengagement failure element cannot be estimated in a case where the gear ratio abnormality is determined at the evacuation gear position, by limiting the upper limit torque of the travelling driving source (the engine 1) based on the function abnormality determination of the line pressure control, thermal deterioration of the friction element can be prevented. That is, when the gear ratio abnormality is determined at the evacuation gear position, it is considered that a slippage friction element is present among the friction elements. At this time, since the thermal deterioration of the friction element progresses when a slippage state at a high input torque continues, it is necessary to keep the input torque to be low so as to delay the progress of the thermal deterioration of the friction element.

(5) The limp home control unit 101c is configured to, determine whether the gear position, which is selected when the gear ratio abnormality is determined during travelling, is a first position (the eighth speed gear position or the ninth speed gear position) which is established with the specific friction element (the first brake B1) in an engaged state, when the gear ratio abnormality is determined during travelling in the first position, determine, as the evacuation gear position, a second position (the third speed gear position or the second speed gear position), in which a combination relationship of the engagement/disengagement of the plurality of friction elements B1, B2, B3, K1, K2, and K3 is inverse to that in the first position, and shift the gear position to the determined second position without shifting the gear position to the neutral state.

Therefore, when the gear position, at the time when the gear ratio abnormality is determined during travelling, is the first position (the eighth speed gear position or the ninth speed gear position), the gear position is shifted to the gear position for the limp home destination with excellent responding property instead of being shifted to the neutral state, and the limp home travelling of the vehicle can be ensured.

(6) The transmission control unit 10 includes a shift solenoid control unit 101d configured to output, to the shift solenoid (the clutch solenoids 20a, 20b, 20c, 20d, 20e, and 20f), an intermediate pressure command corresponding to an input torque capable of preventing a clutch slippage during an in-gear state in which the engaged states of the friction elements are maintained.

Therefore, when the gear ratio abnormality is determined during travelling, it is possible to avoid sudden deceleration and ensure the limp home performance even though the fuse clutch is unspecified. In addition, in a case of an engine vehicle, by keeping an engagement oil pressure during the in-gear state to be low, it is possible to improve the fuel efficiency by reduction of a pump load.

The control device for the automatic transmission according to the embodiment of the invention has been described above based on the first embodiment. However, a specific configuration is not limited to the first embodiment, and design changes and additions are allowed as long as the configuration does not depart from a gist of an invention according to each claim in the scope of claims.

The first embodiment shows an example of the limp home control unit 101c which determines the engagement/disengagement of the first brake B1 based on the rotation/stop information from the intermediate shaft rotation sensor 19, when determining the engagement/disengagement of the specific friction element based on the rotation/stop information of the rotation member of the gear train 3a. However, a sensor used by the limp home control unit is not limited to the intermediate shaft rotation sensor as long as being a sensor that detects the rotation/stop information of the rotation member of the gear train. For example, a rotation sensor that detects engagement/disengagement of the second brake or the third brake may be used.

The first embodiment shows an example of the transmission control unit 10 which includes the shift solenoid control unit 101d that outputs, to the clutch solenoid 20, the intermediate pressure command corresponding to the input torque capable of preventing the clutch slippage during the in-gear state in which the engaged state is maintained during an engagement pressure control of the friction element. However, the transmission control unit can include a shift control unit that outputs a maximum pressure command to the clutch solenoid during the in-gear state in which the engaged state is maintained during the engagement pressure control of the friction element.

The first embodiment shows, as an automatic transmission, the automatic transmission 3 that has six friction elements and achieves nine forward speeds and one reverse speed by engagement of three friction elements. However, the automatic transmission may be one that achieves a plurality of forward speeds and one reverse speed by engaging two friction elements, or one that achieves a plurality of forward speeds and one reverse speed by engaging four friction elements. In addition, the automatic transmission may be a stepped automatic transmission having a gear position other than those of the nine forward speeds and one reverse speed, or a continuously variable transmission with a sub-transmission in which a belt continuously variable transmission and a multi-stage transmission are combined.

The first embodiment shows a control device for the automatic transmission 3 to be mounted on an engine vehicle. However, the control device can be applied not only to the engine vehicle but also as a control device for an automatic transmission of such as a hybrid vehicle and an electric vehicle.

The present application claims a priority under Japanese Patent Application No. 2019-216986 filed to Japan Patent Office on Nov. 29, 2019, and an entire content of this application are incorporated herein by reference.

The invention claimed is:

1. A control device for an automatic transmission, comprising:
a transmission control unit configured to control a shift solenoid provided for each of a plurality of friction elements of a stepped transmission mechanism, and perform a shift control in which a plurality of gear positions are switched by changing engaged states of the plurality of friction elements, wherein
the transmission control unit includes a gear ratio abnormality determination unit and a limp home control unit,
the gear ratio abnormality determination unit is configured to determine that a gear ratio is abnormal when, during travelling at a predetermined gear position, a difference between an actual gear ratio, which is calculated based on a transmission input shaft rotation speed and a transmission output shaft rotation speed, and a set gear ratio at the predetermined gear position is equal to or greater than a set value,
the limp home control unit is configured to:
when the gear ratio abnormality determination unit determines that the gear ratio is abnormal, output a disengagement instruction for disengaging all of the plurality of friction elements,
when it is confirmed that a neutral state is shifted to according to the output of the disengagement instruction, determine engagement/disengagement of a specific friction element among the plurality of friction elements based on rotation/stop information of a rotation member of the stepped transmission mechanism, and
determine an evacuation gear position based on determination information on the engagement/disengagement of the specific friction element, and shift the gear position to the determined evacuation gear position.

2. The control device for the automatic transmission according to claim 1, wherein
the rotation member of the stepped transmission mechanism is an intermediate shaft provided in the stepped transmission mechanism other than a transmission input shaft and a transmission output shaft, and
engagement/disengagement of a friction element that fixes the intermediate shaft to a transmission case is determined based on rotation/stop information of an intermediate shaft rotation sensor that detects rotation of the intermediate shaft.

3. The control device for the automatic transmission according to claim 1, wherein
the gear ratio abnormality determination unit is configured to determine that the gear ratio is abnormal when, during travelling at the evacuation gear position after the gear position is shifted to the evacuation gear position, a difference between the actual gear ratio, which is calculated based on the transmission input shaft rotation speed and the transmission output shaft rotation speed, and a set gear ratio at the evacuation gear position is equal to or greater than the set value, and
the limp home control unit is configured to, when the gear ratio abnormality at the evacuation gear position is determined by the gear ratio abnormality determination unit and a disengagement failure element is estimated, change the evacuation gear position to a second evacuation gear position based on the estimation of the disengagement failure element, and shift to the second evacuation gear position.

4. The control device for the automatic transmission according to claim 1, wherein
a travelling driving source controller that controls a travelling driving source connected to the transmission input shaft includes a torque limit control unit configured to limit an upper limit torque of the travelling driving source in response to a request from the transmission control unit,
the gear ratio abnormality determination unit is configured to determine that the gear ratio is abnormal when, during travelling at the evacuation gear position after the gear position is shifted to the evacuation gear position, a difference between the actual gear ratio, which is calculated based on the transmission input shaft rotation speed and the transmission output shaft rotation speed, and a set gear ratio at the evacuation gear position is equal to or greater than the set value, and the limp home control unit is configured to, when the gear ratio abnormality at the evacuation gear position is determined by the gear ratio abnormality determination unit and a disengagement failure element is not estimated, determine a function abnormality of line pressure control, and output a request for limiting the upper limit torque of the travelling driving source to the torque limit control unit.

5. The control device for the automatic transmission according to claim 1, wherein the limp home control unit is configured to:
determine whether a gear position, which is selected when the gear ratio abnormality is determined during travelling, is a first position which is established with the specific friction element in an engaged state, and
when the gear ratio abnormality is determined during travelling in the first position, determine a second position, in which a combination relationship of the engagement/disengagement of the plurality of friction elements is inverse to that in the first position, as the evacuation gear position, and shift the gear position to the determined second position instead of shifting the gear position to the neutral state.

6. The control device for the automatic transmission according to claim 1, wherein the transmission control unit includes a shift solenoid control unit configured to output, to the shift solenoid, an intermediate pressure command corresponding to an input torque capable of preventing a clutch slippage during an in-gear state in which the engaged states of the friction elements are maintained.

7. A control method for an automatic transmission, the control method being for controlling a shift solenoid provided for each of a plurality of friction elements of a stepped transmission mechanism, and performing a shift control in which a plurality of gear positions are switched by changing engaged states of the plurality of friction elements, the control method comprising:

outputting a disengagement instruction for disengaging all of the plurality of friction elements when, during travelling at a predetermined gear position, a difference between an actual gear ratio, which is calculated based on a transmission input shaft rotation speed and a transmission output shaft rotation speed, and a set gear ratio at the predetermined gear position is equal to or greater than a set value; and shifting to a neutral state according to the output of the disengagement instruction, and then shifting to an evacuation gear position determined based on rotation/stop information of a rotation member of the stepped transmission mechanism.

8. A control device for an automatic transmission, the control device being configured to control a shift solenoid provided for each of a plurality of friction elements of a stepped transmission mechanism, and perform a shift control in which a plurality of gear positions are switched by changing engaged states of the plurality of friction elements, the control device comprising:

a controller programmed to:
output a disengagement instruction for disengaging all of the plurality of friction elements when, during travelling at a predetermined gear position, a difference between an actual gear ratio, which is calculated based on a transmission input shaft rotation speed and a transmission output shaft rotation speed, and a set gear ratio at the predetermined gear position is equal to or greater than a set value; and
shift to a neutral state according to the output of the disengagement instruction, and then shift to an evacuation gear position determined based on rotation/stop information of a rotation member of the stepped transmission mechanism.

9. The control device for the automatic transmission according to claim 8, wherein the rotation member is an intermediate shaft provided in the stepped transmission mechanism other than a transmission input shaft and a transmission output shaft, and
the controller is further programmed to shift to the evacuation gear position determined based on the rotation/stop information of the rotation member of the stepped transmission mechanism.

* * * * *